United States Patent [19]
Andersen et al.

[11] Patent Number: 5,843,544
[45] Date of Patent: *Dec. 1, 1998

[54] ARTICLES WHICH INCLUDE A HINGED STARCH-BOUND CELLULAR MATRIX

[75] Inventors: Per Just Andersen; Simon K. Hodson, both of Santa Barbara, Calif.

[73] Assignee: E. Khashoggi Industries, Santa Barbara, Calif.

[ * ] Notice: The term of this patent shall not extend beyond the expiration date of Pat. No. 5,683,772.

[21] Appl. No.: 661,223

[22] Filed: Jun. 10, 1996

Related U.S. Application Data

[63] Continuation-in-part of Ser. No. 192,965, Feb. 7, 1994, abandoned, Ser. No. 218,967, Mar. 25, 1994, Pat. No. 5,545,450, Ser. No. 288,664, Aug. 9, 1994, Ser. No. 353,543, Dec. 9, 1994, and Ser. No. 577,123, Dec. 22, 1995.

[51] Int. Cl.$^6$ .............................. B32B 5/16; B32B 19/02; B32B 25/02; E05F 1/08
[52] U.S. Cl. .............................. 428/36.5; 16/221; 16/277; 16/385; 206/524.7; 206/562; 428/36.4; 428/158; 428/213; 428/317.9; 428/318.8
[58] Field of Search .............................. 16/221, 277, 385; 206/524.7, 562; 428/158, 108, 182, 213, 317.9, 339, 532, 36.4, 36.5, 35.7, 35.8, 318.8

[56] References Cited

U.S. PATENT DOCUMENTS 3,493,382  2/1970  Ryan et al. .
3,732,112  5/1973  Frankenfeld et al. .

(List continued on next page.)

FOREIGN PATENT DOCUMENTS

0006390 A1  1/1980  European Pat. Off. .
0265745 A2  5/1988  European Pat. Off. .
0447797 A2  9/1991  European Pat. Off. .

(List continued on next page.)

OTHER PUBLICATIONS

Andersen, *Control and Monitoring of Concrete Production; A Study of Particle Packing and Rheology*, The Danish Academy of Technical Sciences (Mar. 1990).

Andersen, *Effect of Organic Superplasticizing Admixtures and Their Components on Zeta Potential and Related Properties of Cement Materials*, Pennsylvania State University (May 1987).

Bishop, *Cotton, Wool and Silk, Make Way For Soybeans*, Wall Street Journal (Jan. 14, 1993).

Clark, *The Incredible, Edible Plastic*, Ag Consultant (May 1993).

(List continued on next page.)

*Primary Examiner*—Marion E. McCamish
*Assistant Examiner*—Blaine R. Copenheaver
*Attorney, Agent, or Firm*—Workman, Nydegger & Seeley

[57] ABSTRACT

Methods and systems for forming hinged starch-bound matrices. Starch-based compositions are molded between heated molds in order to form a cellular matrix and also to remove the water from the starch-based compositions in order to form a binding matrix of solidified starch. The molding apparatus is configured to form one or more creases within the hinge area in order to define one or more lines upon which the hinge will bend. The molding apparatus is also configured such that the region of the mold corresponding to the inner surface of the hinge area will transfer heat more slowly to the inner hinge surface, resulting in reduced thickness of the skin of the inner hinge. This increases the collapsibility, or ability of the inner surface of the hinge to fold or buckle, during the bending action. This in turn reduces the bending radius of hinge such that the hinging action exerts less strain on the outer surface of the hinge. The inner surface of the hinge may optionally be treated with glycerin or other polyols soften the inner surface. The outer surface of the hinge may optionally be coated with an elastomeric material, such as polyvinyl alcohol, in order to strengthen the outer surface and reduce its tendency to fracture during the hinging action.

39 Claims, 15 Drawing Sheets

U.S. PATENT DOCUMENTS

| | | |
|---|---|---|
| 3,949,145 | 4/1976 | Otey et al. . |
| 3,968,004 | 7/1976 | Coffey et al. . |
| 4,017,324 | 4/1977 | Eggers . |
| 4,043,862 | 8/1977 | Roberts . |
| 4,044,166 | 8/1977 | Koizumi . |
| 4,070,196 | 1/1978 | Kraak et al. . |
| 4,076,547 | 2/1978 | Lester et al. . |
| 4,080,213 | 3/1978 | Mori et al. . |
| 4,089,691 | 5/1978 | Cummisford et al. . |
| 4,094,077 | 6/1978 | Schrader et al. . |
| 4,098,453 | 7/1978 | Arneson ................................ 229/45 |
| 4,124,550 | 11/1978 | Kabayashi et al. . |
| 4,133,784 | 1/1979 | Otey et al. . |
| 4,149,550 | 4/1979 | Green et al. . |
| 4,172,154 | 10/1979 | von Rymon Lipinski . |
| 4,204,337 | 5/1980 | Roos et al. . |
| 4,210,490 | 7/1980 | Taylor . |
| 4,225,247 | 9/1980 | Hodson . |
| 4,225,383 | 9/1980 | McReynolds . |
| 4,229,225 | 10/1980 | Kraszewski et al. . |
| 4,249,991 | 2/1981 | Baes et al. . |
| 4,266,713 | 5/1981 | Maroszek . |
| 4,303,690 | 12/1981 | Haas, Sr. et al. . |
| 4,306,059 | 12/1981 | Yokobayashi et al. . |
| 4,328,136 | 5/1982 | Blount . |
| 4,329,177 | 5/1982 | George . |
| 4,377,440 | 3/1983 | Gasland . |
| 4,378,271 | 3/1983 | Hargreaves et al. . |
| 4,382,536 | 5/1983 | Congleton ................. 220/2.5 EC |
| 4,394,930 | 7/1983 | Korpman . |
| 4,410,571 | 10/1983 | Korpman . |
| 4,438,685 | 3/1984 | Haas, Sr. et al. . |
| 4,445,970 | 5/1984 | Post et al. . |
| 4,454,268 | 6/1984 | Otey et al. . |
| 4,456,625 | 6/1984 | Durst . |
| 4,482,386 | 11/1984 | Wittwer et al. . |
| 4,508,595 | 4/1985 | Gasland . |
| 4,511,585 | 4/1985 | Durst . |
| 4,524,682 | 6/1985 | Has, Sr. et al. . |
| 4,529,653 | 7/1985 | Hargreaves et al. . |
| 4,545,854 | 10/1985 | Gomez et al. . |
| 4,549,876 | 10/1985 | Baker et al. . |
| 4,550,655 | 11/1985 | Haas, Sr. et al. . |
| 4,552,463 | 11/1985 | Hodson . |
| 4,562,218 | 12/1985 | Fornandel et al. . |
| 4,567,049 | 1/1986 | Haas, Sr. et al. . |
| 4,588,443 | 5/1986 | Bache . |
| 4,595,623 | 6/1986 | Du Pont et al. . |
| 4,602,590 | 7/1986 | Haas, Sr. et al. . |
| 4,613,627 | 9/1986 | Sherman et al. . |
| 4,623,150 | 11/1986 | Moehlman et al. . |
| 4,624,855 | 11/1986 | Haas, Sr. et al. . |
| 4,625,856 | 12/1986 | Haas, Sr. et al. . |
| 4,648,314 | 3/1987 | Plicht et al. . |
| 4,655,840 | 4/1987 | Wittwer et al. . |
| 4,669,603 | 6/1987 | Haas, Sr. et al. . |
| 4,673,438 | 6/1987 | Wittwer et al. . |
| 4,694,741 | 9/1987 | Haas, Sr. et al. . |
| 4,710,117 | 12/1987 | Haas, Sr. et al. . |
| 4,710,442 | 12/1987 | Fredenucci . |
| 4,711,669 | 12/1987 | Paul et al. . |
| 4,735,811 | 4/1988 | Skarra et al. . |
| 4,749,583 | 6/1988 | Branch . |
| 4,753,710 | 6/1988 | Langley et al. . |
| 4,755,494 | 7/1988 | Ruben . |
| 4,775,580 | 10/1988 | Dighton . |
| 4,781,932 | 11/1988 | Skarra et al. . |
| 4,789,244 | 12/1988 | Dunton et al. . |
| 4,814,012 | 3/1989 | Paul et al. . |
| 4,828,650 | 5/1989 | Wagle et al. . |
| 4,833,191 | 5/1989 | Bushway et al. . |
| 4,846,932 | 7/1989 | Karita et al. . |
| 4,863,655 | 9/1989 | Lacourse et al. . |
| 4,872,913 | 10/1989 | Dunton et al. . |
| 4,889,428 | 12/1989 | Hodson . |
| 4,892,590 | 1/1990 | Gill et al. . |
| 4,912,069 | 3/1990 | Ruben . |
| 4,919,758 | 4/1990 | Wagle et al. . |
| 4,921,250 | 5/1990 | Ayres . |
| 4,923,665 | 5/1990 | Andersen et al. . |
| 4,925,530 | 5/1990 | Sinclair et al. . |
| 4,927,655 | 5/1990 | Ito . |
| 4,927,656 | 5/1990 | Ito . |
| 4,941,922 | 7/1990 | Snyder . |
| 4,943,349 | 7/1990 | Gomez . |
| 4,944,595 | 7/1990 | Hodson . |
| 4,950,490 | 8/1990 | Ghiasi et al. . |
| 4,952,278 | 8/1990 | Gregory et al. . |
| 4,953,453 | 9/1990 | Haas, Sr. et al. . |
| 4,957,558 | 9/1990 | Ueda et al. . |
| 4,957,754 | 9/1990 | Munk et al. . |
| 4,963,603 | 10/1990 | Felegi, Jr. et al. . |
| 4,979,992 | 12/1990 | Bache . |
| 5,032,413 | 7/1991 | Haas et al. . |
| 5,032,414 | 7/1991 | Haas et al. . |
| 5,035,930 | 7/1991 | Lacourse et al. . |
| 5,039,003 | 8/1991 | Gordon et al. . |
| 5,039,378 | 8/1991 | Pommier et al. . |
| 5,043,196 | 8/1991 | Lacourse et al. . |
| 5,048,403 | 9/1991 | Haas, Sr. et al. . |
| 5,059,642 | 10/1991 | Jane et al. . |
| 5,061,346 | 10/1991 | Taggart et al. . |
| 5,071,512 | 12/1991 | Bixler et al. . |
| 5,076,985 | 12/1991 | Koch et al. . |
| 5,082,500 | 1/1992 | Nachtman et al. . |
| 5,095,054 | 3/1992 | Lay et al. . |
| 5,103,717 | 4/1992 | Haas, Sr. et al. . |
| 5,104,487 | 4/1992 | Taggart et al. . |
| 5,104,669 | 4/1992 | Wolke et al. . |
| 5,106,880 | 4/1992 | Miller et al. . |
| 5,108,677 | 4/1992 | Ayres . |
| 5,108,807 | 4/1992 | Tucker . |
| 5,110,413 | 5/1992 | Steer . |
| 5,122,231 | 6/1992 | Anderson . |
| 5,124,161 | 6/1992 | van Lengerich et al. . |
| 5,126,013 | 6/1992 | Wiker et al. . |
| 5,126,014 | 6/1992 | Chung . |
| 5,134,179 | 7/1992 | Felegi, Jr. et al. . |
| 5,153,037 | 10/1992 | Altieri . |
| 5,160,368 | 11/1992 | Begovich . |
| 5,162,126 | 11/1992 | Thorner et al. . |
| 5,178,677 | 1/1993 | Haas et al. . |
| 5,178,730 | 1/1993 | Bixler et al. . |
| 5,185,382 | 2/1993 | Neumann et al. . |
| 5,186,990 | 2/1993 | Starcevich . |
| 5,194,206 | 3/1993 | Koch et al. . |
| 5,201,403 | 4/1993 | Haas, Sr. et al. . |
| 5,206,087 | 4/1993 | Tokiwa et al. . |
| 5,208,267 | 5/1993 | Neumann et al. . |
| 5,209,776 | 5/1993 | Bass et al. . |
| 5,221,040 | 6/1993 | Sorenson . |
| 5,221,435 | 1/1993 | Smith, Jr. . |
| 5,224,595 | 7/1993 | Sugimoto et al. . |
| 5,234,978 | 8/1993 | Delrue et al. . |
| 5,240,561 | 8/1993 | Kaliski . |
| 5,248,702 | 9/1993 | Neumann et al. . |
| 5,252,271 | 10/1993 | Jeffs . |
| 5,253,743 | 10/1993 | Haas, Sr. et al. . |
| 5,256,711 | 10/1993 | Tokiwa et al. . |
| 5,258,430 | 11/1993 | Bastioli et al. . |
| 5,262,458 | 11/1993 | Bastioli et al. . |
| 5,264,030 | 11/1993 | Tanabe et al. . |

| | | |
|---|---|---|
| 5,264,080 | 11/1993 | Shaw et al. . |
| 5,266,368 | 11/1993 | Miller . |
| 5,268,187 | 12/1993 | Quinlan . |
| 5,269,845 | 12/1993 | Grunau et al. . |
| 5,272,181 | 12/1993 | Boehmer et al. . |
| 5,273,167 | 12/1993 | Haas et al. . |
| 5,273,821 | 12/1993 | Olson et al. . |
| 5,275,774 | 1/1994 | Bahr et al. . |
| 5,277,764 | 1/1994 | Johansson et al. . |
| 5,278,194 | 1/1994 | Tickner et al. . |
| 5,279,658 | 1/1994 | Aung . |
| 5,280,055 | 1/1994 | Tomka . |
| 5,284,672 | 2/1994 | Ito . |
| 5,288,318 | 2/1994 | Mayer et al. . |
| 5,288,765 | 2/1994 | Bastioli et al. . |
| 5,290,350 | 3/1994 | Besnard et al. . |
| 5,292,362 | 3/1994 | Bass et al. . |
| 5,296,180 | 3/1994 | Hayes et al. . |
| 5,296,526 | 3/1994 | Delrue et al. . |
| 5,298,273 | 3/1994 | Ito . |
| 5,300,333 | 4/1994 | Wilkerson et al. . |
| 5,308,879 | 5/1994 | Akamatu et al. . |
| 5,314,754 | 5/1994 | Knight . |
| 5,317,037 | 5/1994 | Golden et al. . |
| 5,317,119 | 5/1994 | Ayres . |
| 5,320,669 | 6/1994 | Lim et al. . |
| 5,324,351 | 6/1994 | Oshlack et al. . |
| 5,332,147 | 7/1994 | Sorenson . |
| 5,346,541 | 9/1994 | Goldman et al. . |
| 5,352,709 | 10/1994 | Tarrant et al. . |
| 5,356,467 | 10/1994 | Oshlack et al. . |
| 5,360,473 | 11/1994 | Fleche et al. . |
| 5,360,586 | 11/1994 | Wyatt et al. . |
| 5,360,828 | 11/1994 | Morrison . |
| 5,360,844 | 11/1994 | Delrue et al. . |
| 5,362,312 | 11/1994 | Skaggs et al. . |
| 5,362,776 | 11/1994 | Barenburg et al. . |
| 5,362,777 | 11/1994 | Tomka . |
| 5,367,067 | 11/1994 | Frische et al. . |
| 5,372,877 | 12/1994 | Kannankeril . |
| 5,376,320 | 12/1994 | Tiefenbacher et al. . |
| 5,378,418 | 1/1995 | Berger et al. . |
| 5,382,285 | 1/1995 | Morrison . |
| 5,382,611 | 1/1995 | Stepto et al. . |
| 5,389,322 | 2/1995 | Kim et al. . |
| 5,393,333 | 2/1995 | Trouve . |
| 5,393,804 | 2/1995 | George et al. . |
| 5,395,438 | 3/1995 | Baig et al. . |
| 5,397,834 | 3/1995 | Jane et al. . |
| 5,405,437 | 4/1995 | Leake et al. . |
| 5,405,564 | 4/1995 | Stepto et al. . |
| 5,411,639 | 5/1995 | Kurrie . |
| 5,415,827 | 5/1995 | Tomka et al. . |
| 5,419,962 | 5/1995 | Robertson et al. . |
| 5,427,614 | 6/1995 | Wittwer et al. . |
| 5,428,150 | 6/1995 | De Bock et al. . |
| 5,432,000 | 7/1995 | Young, Sr. et al. . |
| 5,436,078 | 7/1995 | Buhler et al. . |
| 5,447,604 | 9/1995 | Johansson et al. . |
| 5,454,863 | 10/1995 | Foran et al. . |
| 5,456,933 | 10/1995 | Lee . |
| 5,462,980 | 10/1995 | Bastioli et al. . |
| 5,466,493 | 11/1995 | Mefford et al. . |
| 5,470,382 | 11/1995 | Andou . |
| 5,474,856 | 12/1995 | Tanagawa et al. . |
| 5,476,621 | 12/1995 | Kustner . |
| 5,480,923 | 1/1996 | Schmid et al. . |
| 5,487,813 | 1/1996 | Vinson et al. . |
| 5,494,509 | 2/1996 | Kruythoff et al. . |
| 5,496,440 | 3/1996 | Carre et al. . |
| 5,500,089 | 3/1996 | Huang et al. . |
| 5,501,771 | 3/1996 | Bourson . |
| 5,501,774 | 3/1996 | Burke . |
| 5,506,277 | 4/1996 | Griebach, III . |
| 5,512,090 | 4/1996 | Franke . |
| 5,512,135 | 4/1996 | Carre et al. . |
| 5,512,378 | 4/1996 | Bastioli . |
| 5,523,923 | 6/1996 | Jane et al. . |
| 5,525,281 | 6/1996 | Lorcks et al. . |

FOREIGN PATENT DOCUMENTS

| | | |
|---|---|---|
| 0453980 A2 | 10/1991 | European Pat. Off. . |
| 0370913 B1 | 12/1992 | European Pat. Off. . |
| 0546956 A2 | 6/1993 | European Pat. Off. . |
| 0551954 A2 | 7/1993 | European Pat. Off. . |
| 0556774 A2 | 8/1993 | European Pat. Off. . |
| 0405146 B1 | 2/1994 | European Pat. Off. . |
| 0304401 B1 | 3/1994 | European Pat. Off. . |
| 0271853 B2 | 7/1994 | European Pat. Off. . |
| 0608031 A1 | 7/1994 | European Pat. Off. . |
| 0609983 A2 | 8/1994 | European Pat. Off. . |
| 0118240 B1 | 7/1995 | European Pat. Off. . |
| 1278195 | 10/1961 | France . |
| 2642731 | 7/1990 | France . |
| 3346970 | 7/1985 | Germany . |
| 3420195 A1 | 12/1985 | Germany . |
| 4008862 C1 | 4/1991 | Germany . |
| 51-73143 | 6/1976 | Japan . |
| 60-35052 | 2/1985 | Japan . |
| 60-235624 | 11/1985 | Japan . |
| 63-22636 | 1/1988 | Japan . |
| 5-105815 | 4/1993 | Japan . |
| 5-171049 | 7/1993 | Japan . |
| 5-246417 | 9/1993 | Japan . |
| 5-230401 | 12/1993 | Japan . |
| 4-185468 | 2/1994 | Japan . |
| 60-32386 | 2/1994 | Japan . |
| 6-135487 | 5/1994 | Japan . |
| 6-192577 | 7/1994 | Japan . |
| 9100590 | 11/1992 | Netherlands . |
| 1584387 | 2/1981 | United Kingdom . |
| 2050459 | 6/1983 | United Kingdom . |
| 2208651 | 4/1989 | United Kingdom . |
| 2214516 | 9/1989 | United Kingdom . |
| WO 87/00828 | 2/1987 | WIPO . |
| WO 89/02225 | 3/1989 | WIPO . |
| WO 90/10671 | 9/1990 | WIPO . |
| WO 91/12186 | 8/1991 | WIPO . |
| WO 92/04408 | 3/1992 | WIPO . |
| WO 93/01242 | 1/1993 | WIPO . |
| WO 93/22048 | 11/1993 | WIPO . |
| WO 94/03543 | 2/1994 | WIPO . |
| WO 94/18384 | 8/1994 | WIPO . |
| WO 94/18388 | 8/1994 | WIPO . |

OTHER PUBLICATIONS

Davidson et al., *Water–Soluble Resins,* New York: Reinhold Publishing Corp., Chapman & Hall, Ltd., London (1962).

Dow Plastics, *Thermoforming Process Guide.* (no date).

Fedors and Landel, *An Empirical Method of Estimating the Void Fraction in Mixtures of Uniform Particles of Different Size,* Powder Technology, 23, 225–231(Apr. 1979).

Freeman Industries, Inc., *Zein In The Food Industry.* (no date).

Furnas, *Grading Aggregates. I–Mathematical Relations for Beds of Broken Solids of Maximum Density,* Industrial and Engineering Chemistry (Sep. 1931).

Greminger, Jr and Krumel, *Alkyl and Hydroxyalkylalkylcellulose,* Dow Chemical U.S.A., Midland, Oregon. (no date).

Howard, *Universities Make Plea For Cash, . . .* Register (Feb. 11, 1993).

Iowa State University, *Crop Utilization Research/Crop Products Pilot Plant,* Utilization Center for Agricultural Products, Ames, Iowa. (no date).

Johansen et al., *Particle Packing and Concrete Properties,* Materials Science of Concrete II, 111–147. (no date).

Lane, *SoyDiesel: Promising New Market For Soy Oil/Soybeans Come Callin' On Utensils,* Soybean Digest, vol. 54, No. 11 (Dec. 1994).

Lucht, *Golf Tees Out of Corn, Boards From Beans,* Iowa Farmer Today, NW Edition (Jan. 16, 1993).

Lucht, *Product Research Aimed At Propping Up Crop Prices,* Iowa Farmer Today, NW Edition (Jan. 16, 1993).

McGeary, *Mechanical Packing of Spherical Particles,* Journal of the American Ceramic Society, vol. 44, No. 10 (Oct. 1961).

McMurray, *For People Without Livestock, Growing Children Sould Do Fine,* The Wall Street Journal (Mar. 31, 1993).

Osbaeck and Johansen, *Particle Size Distribution and Rate of Strength Development,* Paper for 89th Annual Meeting of the American Ceramic Society, Inc., Pittsburgh, PA (Apr. 26–30, 1987).

Patankar and Mandal, *The Packing of Some Non–Spherical Solid Particles,* Trans. J. Brit. Ceram. Soc., 79, 59–66 (1980).

Ridgway and Tarbuck, *Particulate Mixture Bulk Densities,* Chemical and Process Engineering (Feb. 1968).

Robinson, *Extrusion Defects.* (no date).

Sequa Chemicals, Inc., Technical Data, *Sunrez®700 Series Insolubilizers Coating Additive.* (no date).

Staley Starch and Specialty Products Group, Technical Data, *Sta–Lok®400 Cationic Potato Starch.* (no date).

Stovall, De Larrand, and Buil, *Linear Packing Density Model of Grain Mixtures,* Powder Technology, 48 1–12 (1986).

Swientek, *Formidable Films,* Prepared Foods (Sep. 1993).

United Soybean Board, *New Uses For Soybeans/The Best Is Yet To Be.* (no date).

Vrana, *Khashoggi Kin Reported Planning Private Placement of Shares in New Container Firm* (Mar. 28, 1993).

Weinrich, *German Comes Up With Recycled Product to Replace Foam Chips.* (no date).

Westman and Hugill, *The Packing of Particles* (1930).

Zeneca, *BIOPOL, Nature's Plastic–Born from Nature, Back to Nature* (1993).

Zinkand, *New EcoPLA Plastic Stretches Corn Use,* Iowa Farmer Today, NW Edition (Apr. 2, 1994).

*An Inventive End To A Daily Grind: Do In The Dishes.* (no date).

*Biotec Product Literature.* (no date).

*ISU Researcher Foams At New Breakthrough,* Times–Republican (Jul. 16, 1994).

*Plastic–Forming Processes.* (no date).

*Starch Foam Dishes at Burger King's,* Biomat 32—Production Unit for Natural Packaging. (no date).

ARTICLES WHICH INCLUDE A HINGED STARCH-BOUND CELLULAR MATRIX

RELATED APPLICATIONS

The present application is a continuation-in-part of U.S. application Ser. No. 08/192,965, entitled "Hinges for Inorganically Filled Compositions," and filed Feb. 7, 1994 in the names of Per Just Andersen, Ph.D. and Simon K. Hodson now abandoned; and also a continuation-in-part of U.S. application Ser. No. 08/218,967, entitled "Articles of Manufacture Molded from Inorganically Filled Compositions," and filed Mar. 25, 1994 in the names of Per Just Andersen, Ph.D. and Simon K. Hodson which issued as U.S. Pat. No. 5,545,450; and also a continuation-in-part of U.S. application Ser. No. 08/288,664, entitled "Inorganically Filled, Starch-Based Compositions for Manufacturing Containers and Other Articles Having a Thermodynamically Controlled Cellular Matrix," and filed Aug. 9, 1994 in the names of Per Just Andersen, Ph.D. and Simon K. Hodson now allowed; and also a continuation-in-part of U.S. application Ser. No. 08/353,543, entitled "Articles Having a Starch-Bound Cellular Matrix Reinforced With Uniformly Dispersed Fibers," and filed Dec. 9, 1994 in the names of Per Just Andersen, Ph.D. and Simon K. Hodson now allowed; and also a continuation-in-part of U.S. application Ser. No. 08/577,123, entitled "Compositions and Methods for Controlling Operational Windows in the Manufacture of Starch-Bound Cellular Articles," and filed Dec. 22, 1995 in the names of Per Just Andersen, Ph.D., Amitabha Kumar, Ph.D., and Simon K. Hodson still pending. For purposes of disclosure of the present invention, each of the foregoing applications is incorporated herein by specific reference.

BACKGROUND OF THE INVENTION

1. The Field of the Invention

The present invention relates to the manufacture of starch-bound articles having a lightweight cellular matrix. More particularly, the present invention relates to starch-bound articles that include a hinge structure that is integrally molded within the article, as well as methods and apparatus for forming such hinged articles.

2. The Relevant Technology

Due to political and other pressures stemming from the awareness of the negative environmental impact of using paper, thermoplastics, polystyrene, or metals for a variety of single-use, mainly disposable articles such as containers and other packaging materials, there has been an acute need (long since recognized by those skilled in the art) to find substitute packaging materials that are more environmentally sound. Some have attempted to manufacture articles from starch-containing compositions because starch is a natural, plentiful, and renewable resource. One apparently simple method that has been used to manufacture starch-based articles involves the gelation of starch in water, followed by heating in order to dry out the starch to form a solidified material through what has been characterized as a "retrogradation" process. Another, less successful method involves melting and then cooling the starch like a thermoplastic material to form a solidified material.

In the gelation/retrogradation process, a starch-containing mixture is typically shaped into an appropriate article between heated molds for a period of time sufficient to first gelate the starch-based binder and then remove a substantial portion of the water by evaporation to form a solidified or semi-hardened material. The starch-containing mixture typically includes ungelatinized starch granules together with optional admixtures, such as inorganic mineral fillers and fibers, together with sufficient water to form a mixture having a desired rheology. Depending on the concentration of the various components, both in the starch-containing mixture and the final molded starch-bound cellular matrix, the starch-bound articles molded from such compositions can have a wide range of densities and strength properties. Because such articles are largely starch-bound, and do not include appreciable amounts of artificial plastics or other components, they are readily biodegradable.

The starch-containing mixture is readily moldable into a variety of different shapes to form a number of articles and containers. These include plates, bowls, cups, and "clam shell" style sandwich containers. The clam shell sandwich container is an example of a two-piece article that is preferably hinged in order for it to have the greatest ease of use by the restaurant owner or consumer during packaging and consumption of the sandwich or other component within the clam shell container.

U.S. Pat. No. 5,376,230 to Tiefenbacher et al. shows one prior art attempt at forming a hinge in a clam shell style container. Specifically, reference to FIGS. 1–4 shows that the hinge structure that holds the two container halves or bowls 1 and 2 together comprises "a strip hinge 7 which is received in recesses 5, 6 and which consists of a sheet material, such as a strip, which has been baked with the container bowls which constitute the body." Col. 17, lines 38–42. Tiefenbacher et al. further sets forth examples of the types of sheet material used to form the hinge. Example 7 utilizes a wood free paper; Example 8 utilizes a non-woven textile fabric of cotton/cellulose prefolded in the longitudinal direction; Example 9 utilizes a non-woven fabric of glass fibers prefolded in the longitudinal direction.

While the foregoing strip hinge materials can be advantageously used to join the clam shell container halves together, their use greatly complicates the molding procedure used to manufacture the clam shell container. Specifically, reference to the discussion beginning at col. 17, line 42 through col. 18, line 6, reveals that the strip hinge materials must be carefully molded into the container bowls during the molding process "[t]o prevent a displacement of the two container bowls when they have been folded together." "Sheet materials which are not centrally inserted with respect to the feeding of the baking composition into the succeeding evolution of water vapor will be displaced and will not be bonded at a predefined location." Col. 17, lines 62–66. Hence, great care must be taken in properly inserting the sheet materials into the starch-based composition during the molding process in order to prevent irregularities in placement and subsequent use. The foregoing precautions greatly increase the difficulty, and especially the cost, of mass-producing clam shell style sandwich containers from starch-based compositions.

Many are familiar with clam shell containers manufactured from plastic materials, such as polystyrene foam, which include a hinge integrally molded within the foamed polystyrene structure. Because polystyrene foam is adequately flexible and durable, simply molding a crease into the hinge area defining the junction between the two clam shell halves is adequate to form a reasonably durable hinge between the two polystyrene clam shell halves. In comparison to polystyrene, starch-bound cellular matrices are typically more rigid and brittle. For this reason, Tiefenbacher et al. specifically teaches and claims a mandatory "conditioning" step in which the newly demolded starch-bound articles must be placed in a high humidity chamber in order to for the article to reabsorb water in order to soften and plasticize the otherwise stiff, retrograded starch binder. Col. 15, lines 36–59; claim 1.

Articles manufactured according to Tiefenbacher et al. are conditioned to have a water content within a certain range, the range having a lower limit of about 6% by weight water and an upper limit of 22% by weight water. Tiefenbacher et al. teaches that this conditioning step is necessary in order to obtain the necessary toughness and deformability while maintaining mechanical stability. Notwithstanding the conditioning step, Tiefenbacher et al. specifically teaches the use of hinge strips, such as paper or non-woven fabrics, in order to form a hinge between two halves of a clam shell type container. One of ordinary skill in the art would conclude that the inventors in Tiefenbacher et al. were unable to manufacture starch-based articles having an integrally formed hinge as with polystyrene-based articles. The problem was likely due to the inability to obtain a starch-bound matrix that was simultaneously stiff enough to avoid mechanical deformation or warping of the container halves (which can happen if the starch matrix is over-conditioned to include too much water), and yet flexible enough to avoid fracture or rupture of the hinge upon opening and closing the clam shell container.

In light of the foregoing, what are needed are methods and systems for manufacturing integrally formed hinges within starch-bound cellular matrices.

It would be a further improvement in the art to provide methods and systems for forming a hinge within starch-bound matrices during the manufacture of the entire article such that the article and hinge are manufactured in a single step.

It would be an additional improvement in the art if the integrally formed hinge eliminated the need to introduce foreign materials such as paper strips that need to be inserted into the molding apparatus during the molding of starch-based compositions into the desired articles.

It would yet be an advance in the art to provide methods and systems for manufacturing integrally formed hinges in starch-bound articles that would allow the articles to be opened and closed repeatedly without substantial rupture of the starch-bound matrix.

Such methods and systems for forming an integral hinge within starch-bound cellular matrices are disclosed and claimed herein, as are the hinged starch-bound articles formed thereby.

SUMMARY AND OBJECTS OF THE INVENTION

The present invention involves the formation of durable hinges within articles having a starch-bound cellular matrix. Such articles are manufactured from starch-based mixtures which are molded using heated molds that are specially configured to form a crease in the molded article. The crease provides a hinge area for localized folding or bending, which causes the inner surface or skin of the hinge to compress, while causing the outer surface or skin of the hinge to elongate. The specially configured mold also results in a hinge that is more easily bent and more resilient as a result of optimizing the thickness of the inner and outer skins or surfaces in the area of the hinge.

In general, the starch-bound cellular matrix includes a relatively dense outer surface or skin surrounding a relatively porous interior portion. The skin forms as a result of a process that uses paired male and female molds that are heated to "bake" the starch-based composition and thereby remove water from the starch-based mixture by evaporation. The heated molds are preferably made from metal, which is a good conductor of heat and which has relatively high specific heat. Drying out the starch binder causes it to solidify and form the binding matrix. Because the transfer of heat from the molds to the starch-based mixture occurs only at the surface interface between the molds and the mixture, the skin is dried out more quickly than the interior portion. This allows the interior portion to undergo further expansion and cell formation for a period of time after initial skin formation. Hence, the interior portion is more porous and has a reduced density.

Because metal is such a good conductor of heat, heat inputs are quickly equilibrated throughout the molds such that the mold temperature is essentially uniform throughout each half of the mold pair. This in turn results in almost uniform transfer of heat from the molds to the starch-based mixture. For this reason the skin has been observed to have a remarkably constant thickness throughout and on both sides of the molded articles. Nevertheless, altering the rate of heat transfer during the molding process can change the thickness of the skin. In some cases it may be desirable to optimize the skin thickness since increased skin thickness results in articles having more surface strength. However, skins of increased thickness are also generally more rigid and more likely to fracture if mechanically deformed.

In general, the skin thickness is directly proportional to the rate of heat transfer from the molds to the starch-based mixture. Increasing the rate of heat transfer generally increases the skin thickness; reducing the rate of heat transfer generally reduces the skin thickness. In like fashion, the rate of heat transfer from the molds to the starch-based mixture is directly proportional to the temperature of the molds. Increasing the mold temperature increases the rate of heat transfer, while reducing the mold temperature reduces the rate of heat transfer. Hence, increasing the mold temperature generally results in increased skin thickness, while reducing the mold temperature generally results in decreased skin thickness. However, it is virtually impossible to heat different parts of an integrally formed metal mold to different temperatures in order to alter the skin thickness throughout the molded article.

Accordingly, in order to mold the article such that interior skin portion of the hinge area has reduced thickness, the present invention preferably utilizes specially designed molds in which the portion of the mold surface corresponding to the interior skin portion of the hinge transfers less heat per unit of time compared to the rest of the mold. In a preferred embodiment, the mold area corresponding to the interior skin portion of the hinge comprises a material having lower heat diffusivity, such as polyether ether ketone ("PEEK"). Nevertheless, any material that is heat resistant, durable, and will result in an interior skin portion of the hinge having reduced thickness is within the scope of the present invention. Other materials include silicone rubber, $Al_2O_3$, glass-fiber-reinforced Teflon, porcelain, and other ceramics. Moreover, any mold configuration that is able to reduce the rate of heat flow to the interior skin portion of the hinge area within the molded article such that the interior skin portion has reduced thickness compared to the skin thickness in other portions of the article is within the scope of the present invention. A broad range of different mold materials and configurations that result in the inventive hinge structures will be discussed hereinafter.

Referring to the hinge structure, it will now be explained more precisely what is meant by the "interior skin" portion and the "exterior skin" portion of the hinge area. Assuming that the two halves of the article are initially oriented with an initial angle between them, the "interior skin" is located on the side of the article toward which the two halves will be brought together during closure of the two halves. Accordingly, the "outer skin" is located on the side of the article opposite the "interior skin". Thus, the "interior skin" is on the side of the article in which the initial angle between the two halves is decreased during closure, while the "exterior skin" is on the side in which the initial angle is increased during closure. Because the angle between the two halves of the article decreases during closure, the interior skin is subject to compression, collapse, and buckling, while the outer skin is subject to strain and elongation. Deformation of the interior skin portion of the hinge by compression, and of the exterior skin portion of the exterior skin portion by elongation or stretching, can cause disruption, even fracture, of the starch-bound matrix in the hinge area.

Accordingly, the present invention involves a variety of strategies for increasing the tendency of the interior skin portion of the hinge to collapse or buckle when compressed during closure and also its ability to re-extend during opening without substantial fracture. The most important feature of the hinge for providing this result is the aforementioned molding method in which the interior skin portion of the hinge has a reduced thickness compared to the thickness of the exterior skin portion. The reduced thickness of the interior skin portion results in the interior skin portion being less rigid and more flexible, such as what often occurs when semi-rigid materials are made thinner. In addition, the crease that protrudes inwardly along the length of the interior skin portion of the hinge provides a clean line upon which the hinge will bend and the interior skin will collapse or buckle during closure of the article. The collapsibility, resilience, and durability of the interior skin portion of the hinge can further be improved by treating the interior skin portion with glycerin, a mixture of glycerin and water, or any other similar polyalcohol that can be absorbed into and soften the starch-bound matrix. As will be discussed hereinafter, glycerin and other polyols act as plasticizers and humectants for molded starch.

Similarly, the present invention involves complementary strategies for reducing the amount of strain or elongation of the exterior skin portion of the hinge, and also the ability of the exterior skin portion to remain intact after being strained and elongated in order to improve the flexibility, durability, and resilience of the hinge. Molding the exterior skin portion of the hinge to have a thicker skin relative to the thickness of the interior skin portion results in greater strength and resistance to tensile fracture. In most cases, the exterior skin portion of the hinge will have a thickness that is similar or identical to the thickness of the article skin in general. In addition, the crease on the interior skin side substantially reduces the bending radius of the hinge, which substantially reduces the strain on the exterior skin portion of the hinge during closure of the article by a proportional amount. Incorporating a more easily collapsible interior skin portion has also been found to further reduce the bending radius of the hinge compared to a creased hinge having equal skin thicknesses on both sides. Coating the exterior skin portion of the hinge with an elastomeric coating (e.g., polyvinyl alcohol) greatly increases the strength and endurance of the exterior skin portion. The exterior skin portion may also include a tiny crease or groove opposite the main crease on the interior skin side which acts as a bending initiator to ensure that the exterior skin portion elongates uniformly during the bending action and in the same general area as the collapse or buckling of the interior skin portion.

Another way to reduce the mechanical stresses on the hinge is simply to employ multiple hinges or hinge units in order to reduce the overall bending angle of each individual hinge or hinge unit. Using multiple hinges greatly increases the bending endurance of the hinge by distributing the mechanical stresses over a wider area of the interior and exterior skins of the hinge area. Each hinge unit only experiences a fraction of the overall bend. For instance, assuming the two halves of the article will be bent 180° during closure or hinging action, a single hinge will itself be bent around the entire 180°. However, if a double hinge is used, then each hinge unit will only have to bend about 90°, assuming even distribution of the hinging action between the two hinge units. If a triple hinge is employed, each unit will have to bend about 60°; if a quadruple hinge is use, about 45° each, and so on.

Molding a multiple hinge only requires that the mold apparatus be configured so that it forms as many creases within the interior skin portion of the hinge area as the number of desired hinge units. A double hinge will require two parallel creases, a triple hinge, three, and so on. For every crease on the interior skin portion there can optionally be molded a corresponding bending initiation crease on the exterior skin portion.

In view of the foregoing, it is an object and feature of the present invention to provide methods and systems for manufacturing integrally formed hinges within starch-bound cellular matrices.

It is a further object and feature of the present invention to provide methods and systems for forming a hinge within starch-bound matrices during the manufacture of the entire article such that the article and hinge are manufactured in a single step.

It is an additional object and feature of the present invention to provide methods and systems that eliminate the need to introduce foreign materials such as paper strips that need to be inserted into the molding apparatus during the molding of starch-based compositions into the desired articles.

It is yet another object and feature of the present invention to provide methods and systems for manufacturing integrally formed hinges in starch-bound articles that allow the articles to be opened and closed repeatedly without substantial rupture of the starch-bound matrix.

Accordingly, it is an object of the present invention to increase the collapsibility or ability of the interior skin portion of the hinge to buckle without debilitating fracture during closure of the article halves, and the ability of the interior skin portion to then re-extend during opening of the article halves without debilitating fracture.

Similarly, it is an object of the present invention to reduce the strain, and increase the strength of the exterior skin portion when subjected to tensile stress, during closure of the article halves such that the exterior skin portion does not suffer debilitating fracture.

It is also an object of the present invention to provide methods and systems for manufacturing a hinge structure that includes multiple hinges or hinge portions that distribute the mechanical stresses and deformation over a wide area of the hinge area and result in a more durable hinge.

These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to a specific embodiment thereof which is illustrated in the appended drawings. Understanding that these drawing depict only a typical embodiment of the invention and are not therefore to be considered to be limiting of its scope, the invention will be described and explained with additional specificity and detail through the use of the accompanying drawings listed hereinafter.

DETAILED DESCRIPTION OF THE PREFERRED EMBODIMENTS

Figure 1:
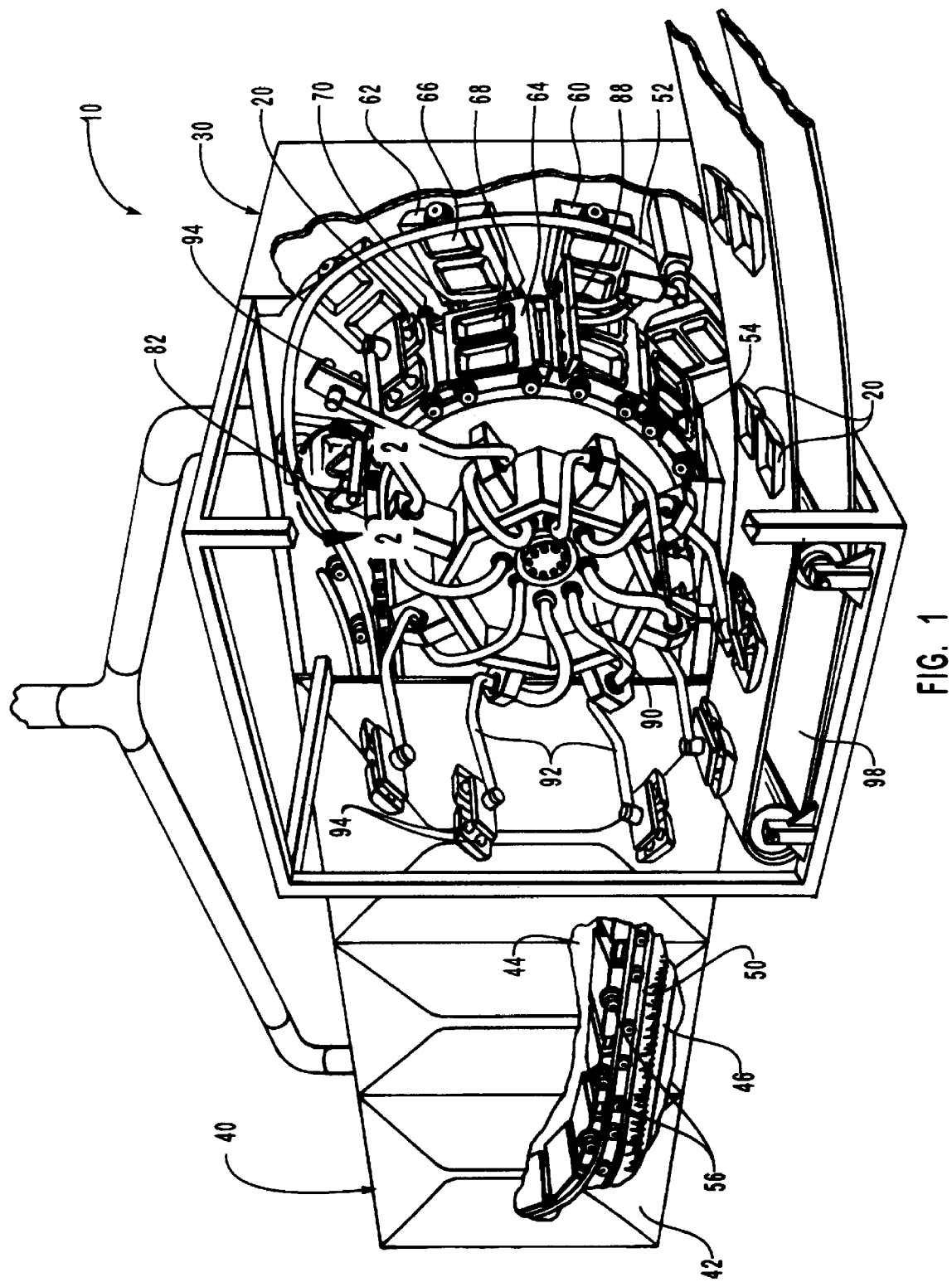
FIG. 1 is a perspective view of a molding apparatus for mass production of hinged articles.

I. GENERAL DISCUSSION.

A. Introduction.

The present invention is directed to hinged starch-bound articles and systems and methods for such articles. More particularly, the present invention encompasses methods and systems for manufacturing hinges having increased resilience and durability. Such hinges are particularly useful in the manufacture of closeable containers, such as "clam shell" sandwich containers, which have a bottom and a lid connected together by a hinge structure. This eliminates the need for introducing foreign materials into the starch-bound cellular matrix in order to form a hinge. Such foreign hinge materials, like paper or plastic strips used in the prior art, will generally not decompose or degrade as fast as the starch-bound cellular matrix once the article has been discarded. They are also not readily recyclable.

Articles formed from starch-based compositions have a porous interior section surrounded by a skin that is denser and less porous than the interior. In general, the thicker the skin, the more rigid the skin and the article in the area of increased skin thickness. Additionally, the thicker the skin the greater the strength of the skin and the article. Conversely, the thinner the skin, the more flexible and easily bent is the article or portion thereof. The present invention utilizes a crease coupled with decreased skin thickness within the interior skin portion of the hinge to increase the bendability of the hinge. As discussed more fully below, the present invention takes advantage of the fact that lowering the rate of heat transfer to a particular area of the article during the molding process will result in a localized area of reduced skin thickness.

In general, starch-based compositions can be molded to yield a wide variety of articles, including containers, plates, cups, "clam shell" sandwich containers, platters, cartons, boxes and other types of containers and articles having mechanical properties that are substantially similar or even superior to articles manufactured using conventional materials, such as paper, polystyrene foam, plastic, metal and glass. Starch-bound articles can usually be made at a fraction of the cost of using conventional materials because of the generally lower cost of the materials inputs and also because of lower overall energy requirements.

The manufacturing processes and resulting articles are less harmful to the environment compared to conventional materials and processes. Theoretically all of the waste associated with the manufacturing process can be directly recycled back into the production line as a filler material. Once the generally disposable articles have fulfilled their intended use, the starch-bound articles are easily recycled into other articles or similar materials with minimum processing. If discarded into the environment, the starch-based binder and other organic components of the articles are in a state which makes them quickly dissolve and/or biodegrade in the presence of moisture, while the inorganic filler is already largely compatible with the earth into which it may be disposed. The inventive articles are of generally low mass.

B. Definitions.

The terms "starch-based composition" or "molding composition", as used in the specification and the appended claims, refers to starch-containing compositions of appropriate rheology that can be molded within heated molds to form articles having a starch-bound cellular matrix. Such compositions typically include a thickening agent, such as gelatinized starch, an ungelatinized starch component that is gelatinized upon molding the composition using heated molds, substantially uniformly dispersed fibers, water, an inorganic filler, and, optionally, a mold-release agent, gums, organic fillers, dispersants, cross-linkers, plasticizers, humectants, and integral coating materials.

The term "ungelatinized starch", as used in the specification and the appended claims, refers to native or otherwise ungelatinized starch or starch derivatives that can be added to the molding composition but which will not become gelatinized until the mixture has been heated to above the gelation temperature of the ungelatinized starch during the molding process. The "total starch" in the starch-based composition comprises the combination of pregelatinized starch and ungelatinized starch, which together constitute the "starch binder" upon the removal of part or substantially all of the free (or unbound) water from the molding composition.

As used in the specification and the appended claims, the term "total solids" includes the actual solids together with any admixtures that may be added to the starch-based composition that are initially dissolved into the "fluid fraction" but which will form a solid upon the removal of water by evaporation during or after the molding process. The "fluid fraction" is the portion of the composition comprising the water and any liquids or solids that are dissolved within the water (e.g., pregelatinized starch, magnesium stearate, etc.). The "solid fraction" is the portion of the composition that includes the solids that are not dissolved in the water (e.g., fibers, inorganic fillers, etc.)

The terms "fiber-reinforced cellular matrix", "starch-bound cellular matrix" or "starch-bound matrix", as used in the specification and the appended claims, shall refer to the substantially hardened structure of the articles manufactured herein.

The terms "hardening" or "drying", as used in this specification and the appended claims, refers to the process of removing water from the molding mixture, particularly from the starch-based gel, to produce a form-stable article. The term "hardening", however, is not limited by the extent of gelation of the ungelatinized starch component or the amount of water actually removed.

The term "form-stable", as used in the specification and the appended claims, refers to the state in which the starch-bound matrix of the newly demolded article has sufficient strength and structural integrity that it can be removed from the mold, support its own weight against the force of gravity, resist destructive water vapor expansion, and resist significant deformation when exposed to subsequent processing and handling.

The terms "molded article", "starch-bound article", or "article of manufacture", as used in the specification and the appended claims, are intended to include any article that can be formed using the disclosed compositions and processes. Containers and other articles that can be formed using the compositions and processes of the invention include, but are not limited to, the following: cartons, boxes, sandwich containers, hinged or two-part "clam shell" containers, dry cereal boxes, frozen food boxes, milk cartons, fruit juice containers, carriers for beverage containers, ice cream cartons, cups (including, but not limited to, disposable drinking cups and cone cups), french fry scoops, fast-food carry out boxes, packaging, support trays (for supporting products such as cookies and candy bars), cans, yoghurt containers, sleeves, cigar boxes, confectionery boxes, boxes for cosmetics, plates, vending plates, pie plates, trays, baking trays, bowls, breakfast plates, microwaveable dinner trays, "TV" dinner trays, egg cartons, meat packaging platters, disposable single use liners which can be utilized with containers such as cups or food containers, cushioning materials (i. e., "peanuts"), bottles, jars, cases, crates, dishes, lids, straws, partitions, liners, anchor pads, corner braces, corner protectors, clearance pads, hinged sheets, trays, funnels, cushioning materials, and other objects used in packaging, storing, shipping, portioning, serving, or dispensing an object within a container, and an endless variety of other objects.

The terms "hinge", "hinge area", or "hinge structure" refer to the specific structure manufactured according to the present invention that includes, at a minimum, a crease and an interior skin portion having reduced thickness compared to the thickness of the rest of the article. A "hinge" may include a unitary hinge or multiple hinge portions. The hinge can be designed to be folded up to angles of 360°. The hinge area may optionally be treated with a softening agent (e.g., glycerin) and/or an elastomeric coating to increase the flexibility and durability of the hinge.

II. STARCH-BASED COMPOSITIONS.

The following is a general discussion of the identities, properties, and preferred proportions of each of the components that may be added to the molding compositions, along with how each component is interrelated with the processing parameters, properties of the moldable composition, and properties of the final starch-bound articles.

A. Starch.

The molding compositions used to manufacture starch-bound articles include starch as the primary binder, which acts as a binder through the formation of a starch gel and subsequent removal of water by evaporation from the starch gel. Starch is a natural carbohydrate chain comprising primarily condensed glucose molecules stored in plants in granular form.

In general, starch granules are insoluble in cold water and are gelatinized by raising the water temperature to above the gelatin temperature of the starch granules. When the starch granules are exposed to hot water, the granule walls soften, swell, and then burst to release the starch chains, which result in the gelation of the liquid fraction of the mixture. The exact temperature at which a particular starch granule swells and gelates depends on the type of starch it is. Corn starch, for example, gelates at a higher temperature than potato starch. Unmodified starch granules can be gelated in cold water if the outer membrane has been broken by, e.g., grinding the starch granules. Alternatively, starch can be chemically modified so that it will gelate in cold water. Gelated and hardened starch binds the individual filler particles and fibers within the composition that has been molded into the desired shape of the article.

Although starch is produced in many plants, an important source are seeds of cereal grains (e.g, corn, waxy corn, wheat, sorghum, rice, and waxy rice). Another important source includes tubers such as potatoes, roots such as tapioca (i.e., cassava and manioc), sweet potato, and arrowroot, and the pith of the sago palm.

The term "starch" includes both unmodified and modified starches. By "modified," it is meant that the starch can be derivatized or modified by typical processes known in the art such as, e.g., substitution, esterification, etherification, oxidation, acid hydrolysis, cross-linking, and enzyme conversion. Typical modified starches include esters, such as the acetate and the half-esters of dicarboxylic acids/anhydrides, particularly the alkenylsuccinic acids/anhydrides; ethers, such as the hydroxyethyl and hydroxypropyl starches; oxidized starches, such as those oxidized with hypochlorite; starches reacted with cross-linking agents, such as phosphorus oxychloride, epichlorohydrin, hydrophobic cationic epoxides, and phosphate derivatives prepared by reaction with sodium or potassium orthophosphate or tripolyphosphate, and combinations thereof. Modified starches also include seagel, long-chain alkylstarches, dextrins, amine starches, and dialdehyde starches.

A smaller portion of the starch within the molding composition is preferably gelatinized in order to aid the dispersion of the components throughout the composition, particularly the fibers. In addition, the gelatinized starch fraction keeps the solid components from settling within the composition. The starch can be gelatinized by heating unmodified starch in the presence of water, or by adding a modified starch to the aqueous composition.

Nevertheless, the unmodified starch component will generally comprise the majority of total starch within the molding composition. In its unmodified, granular state, unmodified starches will not gelate in cold water and do not appreciably affect the rheology of the liquid fraction of the molding composition. Hence, unmodified starch can be included in significantly large amounts without greatly affecting the rheology of the molding composition since their primary effect on system rheology is negligible until the composition is heated during the molding process. Once the starch-based composition has been properly positioned within the heated molds, the increased viscosity and green strength imparted by the newly gelated unmodified starch component is advantageous.

From a cost standpoint, it is advantageous that the majority of total starch comprises unmodified starch granules, which are typically far less expensive compared to modified starches. In fact, unmodified starch granules derived from potato starch are very inexpensive and are often treated as useless waste products. In some countries it is discarded or fed to cattle as a cheap feed material. Hence, the use of unmodified starches provides a tremendous economic advantage over other materials and also provides a useful outlet for such previously discarded materials.

A preferred starch is potato starch, which quickly gelates and reaches a maximum viscosity and yield stress at about 65° C. The viscosity and yield stress of a mixture containing gelatinized potato starch and water then decreases as the temperature is raised further until water is evaporated, after which the viscosity and yield stress increase precipitously. Waxy corn starch acts in a similar fashion and is also preferred. Potato and waxy corn starch are also preferred because they swell and gelate easily in a single step; however, any starch that has similar swelling characteristics will be preferred to those that swell in two or more stages.

B. Water.

Water is an important component within starch-based compositions used to mold starch-bound articles. Water aids in the dispersion of the fibrous component throughout the starch-based composition. Water is important for overall molding composition rheology in order to obtain a composition that can be readily mixed, transported, and injected into the molding apparatus. Water is important in lubricating the solid particles, solvating the dissolvable or gelatable components and in achieving the proper viscosity and yield stress of the composition. The water acts as a gelating agent that gelates the ungelatinized starch granules during the heated molding process. The subsequent removal of water by evaporation from the starch causes it to solidify and bind the solid components together within the molded article. Finally, the water aids in forming the cellular structure.

At a minimum, a sufficient amount of water should be added to disperse and uniformly gelate the starch within the molded starch-based composition. The water content should also be sufficient to function with the particular processing equipment being employed.

Increasing the water content increases the number and size of the cells or voids in the structural matrix and lowers the density of the resulting article. In theory, the more water in a mixture, the more vapor that is produced, and thus, the more cells in the interior and the more pinholes in the surface that are formed. In contrast, using less water yields a more dense product having smaller cells.

The amount of water that is added to the molding compositions used to manufacture starch-bound articles will preferably be in a range from about 15% to about 80% by weight of the mixture, and more preferably from about 30% to about 70% by weight. In general, the amount of water will be determined by the desired rheology of the composition as well as the desired porosity and density of the final product.

C. Fibers.

The terms "fibers" and "fibrous materials" include both inorganic fibers and organic fibers. The use of fibers has been found to provide a number of useful benefits. Fibers serve to reinforce the structural matrix of the molded articles. More specifically, they serve to increase the cohesion of the partially hardened articles, giving them increased form stability; they also increase the elongation, deflection, toughness, fracture energy, flexural strength, and tensile strength of the articles. Fibers also aid retaining small amounts of residual water within the newly molded articles by preventing collapse or over expansion of the cellular structural matrix due to the softening effect of the water. In the prior art, articles had to be over dried in order to be successfully demolded, then conditioned to reimpart moisture and reduce brittleness.

It has been found that the greatest benefit occurs when fibers preferably having a length greater than about 1.5 mm and/or fibers having an aspect ratio of at least about 25:1 are used. More preferably, the fibers will have a length greater than about 2 mm. Most preferably, the fibers will have a length greater than about 3.5 mm and an aspect ratio of at least about 100:1. Of equal or greater importance is the level of dispersion of the fibers. More homogenous dispersion of the fibers results in far greater strength and toughness of the final product. On the other hand, poorly dispersed or clumped fibers often result in a decrease in strength compared to compositions in which no fibers are used. The use of significant quantities of pregelatinized starch in the molding composition aids in the homogenous dispersion of fibers throughout the composition by transferring shear from the mixing apparatus down to the fiber level.

Fibers that may be used preferably include naturally occurring organic fibers, such as cellulosic fibers extracted from hemp, cotton, plant leaves, sisal, abaca, bagasse, wood (both hardwood or softwood, examples of which include southern hardwood and southern pine, respectively), or stems, husks, shells, and fruits, or inorganic fibers made from glass, graphite, silica, ceramic, or metal materials. Any equivalent fiber which imparts strength and flexibility is also within the scope of the present invention. Recycled paper fibers can be used but are somewhat less desirable because of the fiber disruption that occurs during the original paper manufacturing process.

The amount of fibers added to the molding composition will vary depending upon the desired properties of the final molded article. The flexural strength, toughness, flexibility, and cost are principle criteria for determining the amount of fiber to be added to the composition. The concentration of fibers will preferably be in a range from about 1% to about 40% by weight of the molding composition, more preferably from about 2% to about 20% by weight, and most preferably from about 3% to about 10% by weight.

D. Solid Fillers.

The term "fillers", as used in the specification and the appended claims, includes both inorganic and inert organic filler particles but does not typically include fibers, except fibrous materials having very low aspect ratio and which impart little or no strengthening effect. In general, fillers do not strengthen the structural matrix, but merely add mass and reduce the starch requirements. However, inorganic mineral fillers generally increase the stiffness of the articles, which is advantageous where a stiffer article is desired. Mineral ii fillers also help the article resist mechanical deformation when exposed to changes in ambient moisture.

Inorganic materials commonly used in the paper industry, as well as more finely ground filler materials used in the concrete industry, may be used in the molding compositions. Examples of useful inorganic fillers include perlite, vermiculite, sand, gravel, rock, limestone, sandstone, glass beads, aerogel, xerogels, seagel, mica, clay, synthetic clay, alumina, silica, fly ash, fused silica, zeolites, tabular alumina, kaolin, microspheres, hollow glass spheres, porous ceramic spheres, gypsum (calcium sulfate dihydrate), calcium carbonate, calcium aluminate, lightweight polymers, xonotlite (a crystalline calcium silicate gel), lightweight expanded clays, hydrated or unhydrated hydraulic cement particles, pumice, exfoliated rock, and other geologic materials.

A dry-milled calcium carbonate is a preferred inorganic aggregate, since it can be obtained at one-third the cost of calcium carbonate obtained through wet-milling. A preferred calcium carbonate is R040, which has a particle size range from about 10 to 150 microns, with an average particle size of about 42 microns, and a low specific surface area. Both clay and gypsum are particularly important aggregate materials because of their ready availability, extreme low cost, workability, ease of formation, and because they can also provide a degree of binding and strength if added in high enough amounts (in the case of gypsum hemihydrate).

Examples of fillers which can add a lightweight characteristic and higher insulation to the molded articles include perlite, vermiculite, glass beads, hollow glass spheres, synthetic materials (e.g., porous ceramic spheres, tabular alumina, etc.), cork, pumice, and light-weight expanded clays, sand, gravel, rock, limestone, sandstone, and other geological materials.

The inorganic filler is preferably included in an amount in a range from about 20% to about 80% by weight of solids in the starch-based composition, preferably in a range from about 30% to about 70%, and more preferably in a range from about 40% to about 60% by weight. If included, inert organic fillers will preferably be included in an amount in a range from about 5% to about 60% by weight of the total solids. If included, lightweight fillers, defined as those having a density lower than about 1 g/cm$^3$, are preferably included in an amount in a range from about 5% to about 85% by weight of the inorganically filled molding composition, more preferably from about 15% to about 65%, and most preferably from about 25% to about 55% by weight.

E. Mold-Releasing Agents.

To assist in demolding the newly formed articles, a mold-releasing agent can be added to the moldable composition. Medium- and long-chain fatty acids, their salts, and their acid derivatives can be used as mold-releasing agents. Preferred mold-releasing agents for use in the present invention include stearates, which have hydrophobic properties and are not soluble in water. Stearate are salts of stearic acid and have the general formula of $CH_3(CH_2)_{16}COO^-X^+$, where $X^+$ can be an ion of Al, Mg, Na, K, or Ca. Aluminum stearate is one preferred mold release agent that has been approved by the FDA.

Silicones can also be used as mold releasing agents. Lecithin, which is a mixture of phosphatides and glycerides, can contribute to lessening of the stickiness of the molding composition, providing mold releasing properties, and can improve the flexibility of the formed articles. Various waxes such as paraffin and bees wax, and Teflon-based materials can also be used as mold-releasing agents. To further assist in releasing the articles from the molds, the molds can be polished, chrome plated, or coated with, e.g., nickel, Teflon, or any other material that limits the tendency of the articles to stick to the molds.

F. Optional Admixtures and Post-Formation Treatments.

The starch-based composition may optionally include other admixtures to change the rheology of the mixture and/or to improve the mechanical properties of the final molded product. Examples of useful rheology-modifying agents include polysaccharide gums, such as alginic acid, phycocolloids, agar, gum arabic, guar gum, locust bean gum, gum karaya, gum tragacanth, and mixtures thereof. A preferred gum is guar gum, which aids in preventing segregation of the fibers from the mixture; it also acts as a pumping aid by preventing aggregation or blockage of the fibers within the pump apparatus.

Other admixtures include humectants, plasticizers, crosslinking agents, water-proofing agents, additional binding agents, and the like.

The molded articles can be treated in a variety of different ways to improve the mechanical and/or chemical properties of the articles. For example, the surface of the starchbound cellular matrix can be treated with a polyol, such as glycerin, preferably aqueous glycerin for increased penetrability. Glycerin acts as a plasticizer, a humectant, and a stabilizer for reducing warping when ambient humidity changes. The surface can also be treated with a coating material for increasing resistance of the article to moisture and/or for strengthening the article, particularly to prevent or reduce the effects of fracturing during bending of the starch-bound cellular matrix.

III. PREPARING AND MOLDING THE STARCH-BASED COMPOSITIONS.

Starch-bound articles of manufacture are typically produced through a multi-step process, which includes preparing the mixture and then molding the composition at an elevated temperature into the desired articles. Additional optional processing steps may include, for example, printing, coating, conditioning, and packaging of the final articles, in addition to the post-formation treatment with glycerin and/or localized or general elastomeric coatings.

A. Preparing the Mixture.

There are a number of different mixing apparatus and mixing sequences that can be used to yield the compositions of the present invention. The only criterion is that the mixing means be able to yield a starch-based composition in which all of the components, particularly the fibrous material, are substantially homogeneously mixed throughout the composition. Both high shear and low shear mixing apparatus are preferred depending on the stage of the mixing process. Typically, the formation of a pregel mix and also the dispersion of fibers is carried out using a high shear mixing apparatus. However, when mixing in the additional ungelatinized starch component and also fragile inorganic fillers which are more easily broken, it will generally be preferable to use a low shear mixer in order to protect the starch granules from prematurely gelatinizing and also to prevent the fragile aggregate fillers from breaking.

In a preferred embodiment, a portion of the water and starch are blended together with the fibers and, optionally, the inorganic filler, in order to form a preblend mixture. This is done at high shear. Gums such as guar gum are generally added to the preblend mixture. Thereafter, the remainder of the water and the ungelatinized starch are added to the preblend mixture and mixed at low shear to blend the starch without causing it to prematurely gelatinize. The mold release agent is typically added during this second mixing phase. Weaker, lightweight aggregate fillers should also be combined using low shear mixing.

Examples of high shear mixers include the TMN turbo batter mixers that are available from Franz Haas Waffelmaschinen, Industriegesellschaft M.B.H. of Vienna, Austria. Alternative high shear mixers are disclosed and claimed in U.S. Pat. No. 4,225,247 entitled "Mixing and Agitating Device"; U.S. Pat. No. 4,552,463 entitled "Method and Apparatus for Producing a Colloidal Mixture"; U.S. Pat. No. 4,889,428 entitled "Rotary Mill"; U.S. Pat. No. 4,944,595 entitled "Apparatus for Producing Cement Building Materials"; and U.S. Pat. No. 5,061,319 entitled "Process for Producing Cement Building Material". For purposes of disclosure, the foregoing patents are incorporated herein by specific reference. Alternatively, a variable speed mixer can be used to provide both high and low shear mixing. Variable speed mixers include the Eirich Rv-11. An example of a low shear mixer is a Hobart Mixer.

Once the components have been adequately dispersed throughout the starch-based composition, the starch-based composition is ready for molding. It may be desirable at this stage to increase the water content in order to adjust the viscosity of the molding composition to a desired level.

B. Forming the Mixture into the Desired Article.

Once the molding apparatus has been prepared, it is preferably formed into the desired shape of the article through the use of heated molds. A detailed description of the type of molding apparatus that may be used to mold the articles of the present invention is set forth in U.S. Ser. No. 08/353,543 now allowed, referenced above. U.S. Ser. No. 08/353,543 now allowed, also sets forth a detailed description of preferred methods for generally molding starch-based compositions using the disclosed apparatus.

The molding apparatus should be heated to a temperature that is sufficiently high to cause the rapid expansion of a starch-based composition within the molding apparatus and also in order to drive off a substantial portion of the water by evaporation. Preferably, the molding apparatus should be heated to a temperature greater than about 145° C., more preferably greater than about 175° C., and most preferably greater than about 195° C. The temperature should not be so great, however, so as to cause burning, scorching or carmelization of the starch binder. This generally occurs at temperatures greater than about 250° C. In most cases, it will be preferable to maintain one mold component at a temperature that is slightly hotter than the other half, such as 5° or 10° C. hotter. It has been found that the molded article will be more easily released from the mold component kept at the hotter temperature, thereby designating the mold component from which the article will be removed last.

The molds are preferably made of metals such as steel, brass, and aluminum. Polished metals, including chrome and nickel, along with Teflon coatings, make it easier to remove the articles from the molds and create a smoother finish. The material of the molds must be able to withstand the temperatures and pressures encountered during the manufacturing process.

The molds can be heated by a variety of heating means. Examples of heating means for heating at least the surfaces of the molds include: external heating elements, such as gas burners, infrared light, and electrical heating elements, which can be attached or directed at the molds. Other alternative examples of heating means are heated liquids, such as oils or heated gases, such as steam, that can be piped through the molds to heat them. Various types of heating can also be used to vary the temperature of the molds along the length of the molds in order to vary the properties of the hardened matrix within the molded article. It is also possible to heat the mixtures without heating the molds. For example, the molds can be made out of ceramic and microwaves be applied to heat the mixture.

By varying the temperature and processing time it is possible to affect the density, porosity, and thickness of the surface layer, or skin. Generally, in order to yield a molded article having a thinner but more dense surface layer, the molding temperature is lower, the molds have fewer vents, and the moldable mixture has a higher viscosity. The viscosity of the mixture can be increased by adding a rheology-modifying agent, such as Tylose®, including less water, or by using an aggregate material having a higher specific surface area.

FIG. 1 depicts a perspective view of one embodiment of a molding apparatus for mass production of molded starch-bound articles, which is commercially available as the BIOMAT 32 starch foam expansion unit from Walterwerk Kiel GmbH. & Co. KG, located in Kiel, Germany. As shown in FIG. 1, molding apparatus 10 functions in a continuous process to mass produce desired articles 20 which in this embodiment are hinged "clam-shell" containers.

Articles 20 are formed in several stages that are simultaneously being performed by different components of molding apparatus 10. Molding apparatus 10 has a forming station 30 attached to and communicating with a heating station or heating apparatus 40. Heating apparatus 40 includes an insulation wall 42 that defines a heating chamber 44. Heating apparatus 40 further comprises heating elements 46, are positioned within heating chamber 44 for providing heat therein. Heating apparatus 40, and more particularly the component of heating apparatus 40 which includes insulation wall 42, heating chamber 44 and heating elements 46 are an example of a heating means for heating the molds, or at least one mold wherein the heating means is in thermal communication with at least one mold.

Figure 2:
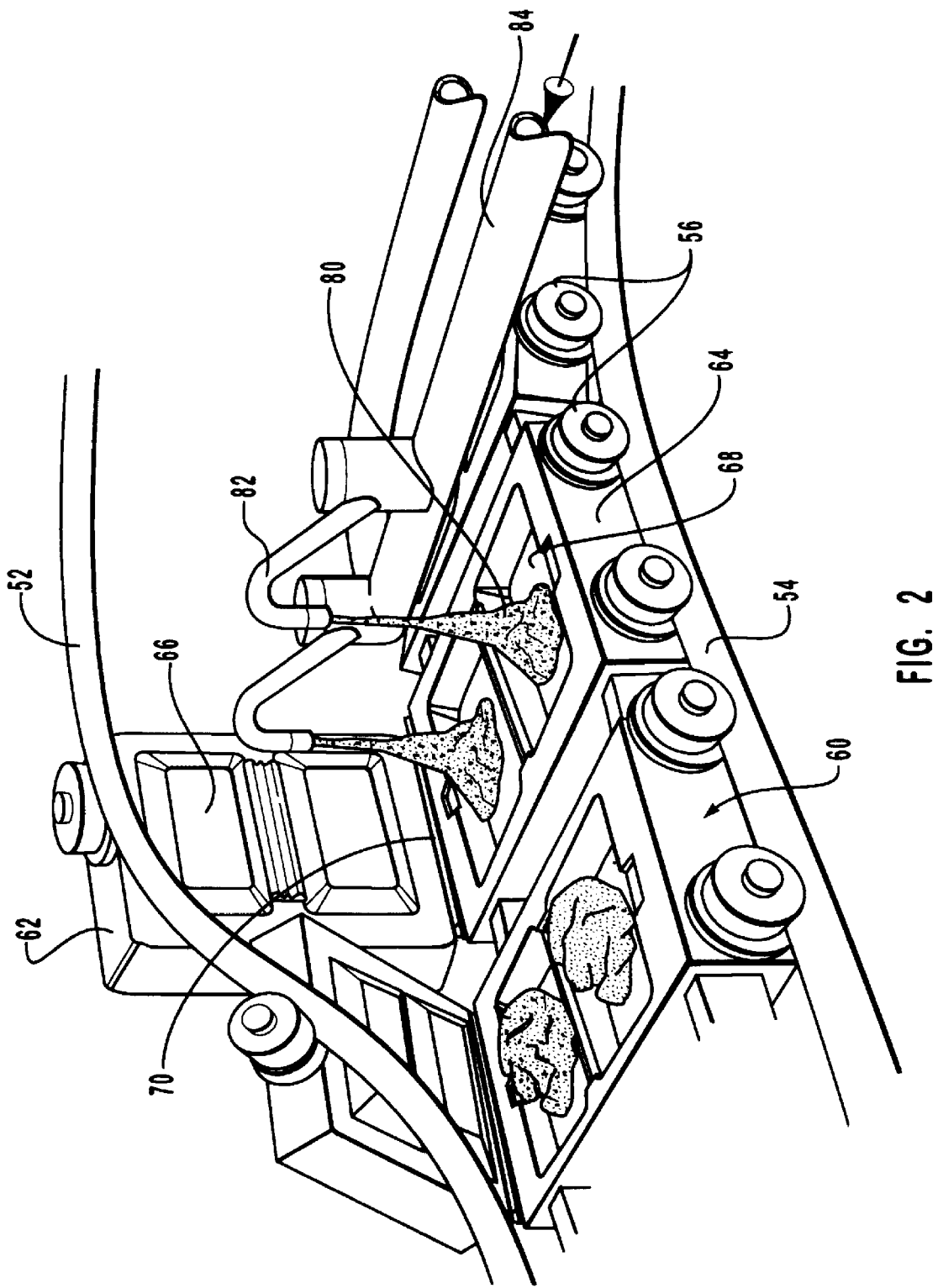
FIG. 2 is a perspective view of a mold in the filling position in the molding apparatus shown in FIG. 1.

A track system 50 extends through both forming station 30 and heating chamber 44 in a continuous, circular fashion. Track system 50 includes an upper track 52 and a lower track 54. Riding on track system 50 via wheels 56 are a plurality of interconnected heated molds 60. As best shown in FIG. 2, each mold has two components including a top plate 62 and a bottom plate 64. Top plate 62 and bottom plate 64 include a male mold 66 and a female mold 68, respectively. Top plate 62 and bottom plate 64 are connected together at one end by a hinge 70. Male mold 66 and female mold 68 are configured to enable male mold 66 and female mold 68 to be coupled together at an offset distance sufficiently close to mold a composition into an article. In the embodiment shown in FIGS. 1–2, top plate 62 and male mold 66 are integrally connected as are bottom plate 64 and female mold 68.

Hinge 70 is an example of a movement means for increasing and decreasing the offset distance between male mold 66 and female mold 68 by moving top plate 62 and bottom plate 64 together and apart. Hinge 70 enables male mold 66 and female mold 68 to be brought into sufficiently close proximity with each other that a composition placed between male mold 66 and female mold 68 can be molded into an article of manufacture, and whereby the article can be removed by then increasing the distance between male mold 66 and female mold 68.

Referring to FIG. 2, in the first stage, heated molds 60 are open and positioned to receive a moldable mixture 80 from filling spout 82. Moldable mixture 80 is pumped from a mixer (not shown) via an extruder through a dispensing pipe 84 to filling spout 82. Filing spout 82, dispensing pipe 84 and an extruder or the equivalent are an example of means for delivering a moldable mixture to heated molds 60. Heated molds 60 are opened by separating upper track 52 and lower track 54 on which top plate 62 and bottom plate 64 ride, respectively. Filling spout 82 is used to discharge a selected quantity of moldable mixture 80 into female mold 68, although this system can be modified to accommodate compositions having greatly varying rheologies. For example, highly viscous or high yield mixtures can be extruded to form a discrete volume of material, which is then separated and dropped into the mold by a cutting means. Once female mold 68 is filled, heated molds 60 advance and are closed as a result of upper track 52 and lower track 54 closing together. Conventional locking mechanisms can be used to lock the mold halves together as long as they are able to withstand the pressures produced by the heated mixtures which is up to about 5 Bars.

Referring to FIG. 1, heated molds 60 travel the length of heating apparatus 40, rotate to an inverted position, and then travel back to forming station 30. Heating elements 46 are positioned within heating chamber 44 for heating heated molds 60 as they travel therethrough. The speed at which heated molds 60 travel through heating apparatus 40 is in part limited by the required time it takes to fill heated molds 60. The filling time is, of course, dependent on the size of the article being molded. The forming time and temperature are selected so that when heated molds 60 return to forming station 30, the formed articles can be removed from the molds in a form-stable condition. Once the molds return to forming station 30, heated molds 60 are again opened by separating upper track 52 and lower track 54. A scraper blade 88 is then passed over female mold 68 to remove excess material that may have exited through vent holes during the heating process.

The formed articles are removed from female mold 68 by a means for removing the formed articles from a mold. An example of a removing means is shown in FIG. 1 and comprises a rotating drum 90 with a plurality of rotating arms 92. Arms 92 are attached to attached to the rotating drum 90 or the axle of the rotating drum 90 and follow the rotational speed of the axle of drum 90. Rotating arms 92 are attached to vacuum suction cups 94 configured to remove formed articles 20 from female mold 68. Vacuum suction cups 94 are made of silicone rubber and are heat resistant up to about 250° C. Movement of drum 90 is controlled by track system 50, with drum 90 positioned within lower track 54. As drum 90 rotates, arms 92 bend in toward the opened heated mold to pick up formed products 20 with suction cups 94. Arms 92 then bend outward from drum 90 and a conveyer belt 98 is used to catch and transfer formed products 20 for subsequent processing such as applying a coating thereto. With formed products 20 removed form heated molds 60, the molds return to filling spout 82 and the process is repeated.

In an alternative process for forming articles of the invention using molding apparatus 10, a moldable mixture 80 is prepared using a Hobart mixer, Eirich mixer, or similar mixer having an 80 gallon capacity. Such a mixer provides enough material for the production of at least about 3000 articles per hour, and up to about 14,000 per hour. The moldable mixture is then transferred to a vacuum hopper and pumped using a monopump having one auger through a dispensing pipe 84 to filling spout 82. The monopump in combination with dispensing pipe 84 and filling spout 82 provide another example of means for delivering a moldable mixture to heated molds 60. The monopump pushes the material under pressure at a rate of about 6 kg/min. A guillotine mechanism is used to open and shut filling spout 82 for a specific time, preferably for about 0.3 seconds. This allows about 30 grams of the moldable mixture to be dispensed into female mold 68. The filled molds then go through heating apparatus 40 at a rate of 35 cm per second and are heated for about 30–35 seconds. The formed articles are then removed from the molds by vacuum suction cups 94 as described above and are placed on conveyer 98. No subsequent conditioning of the formed articles of the invention is required before being suitable for use.

By using the compositions and methods disclosed herein, a wide variety of different articles can be molded that will have adequate strength and structural integrity to be demolded and then shipped to the desired destination without the need for a subsequent lengthy conditioning step. The ability to manufacture articles without a conditioning step, or simply a very short conditioning step, is a significant improvement over the prior art. It also within the scope of the invention to further treat the molded articles to enhance their flexibility and durability.

C. Skin Thickness.

In general, the starch-bound cellular matrix includes a relatively dense outer surface or skin surrounding a relatively porous interior portion. The skin forms as a result of a process that uses paired male and female molds that are heated to "bake" the starch-based composition and thereby remove water from the starch-based mixture by evaporation. The heated molds are preferably made from metal, which is a good conductor of heat and which has relatively high specific heat. Drying out the starch binder causes it to solidify and form the binding matrix. Because the transfer of heat from the molds to the starch-based mixture occurs only at the surface interface between the molds and the mixture, the skin is dried out more quickly than the interior portion. This allows the interior portion to undergo further expansion and cell formation for a period of time after initial skin formation. Hence, the interior portion is more porous and has a reduced density.

Because metal is such a good conductor of heat, heat inputs are quickly equilibrated throughout the molds such that the mold temperature is essentially uniform throughout each half of the mold pair. This in turn results in almost uniform transfer of heat from the molds to the starch-based mixture. For this reason the skin has been observed to have a remarkably constant thickness throughout and on both sides of the molded articles. Nevertheless, altering the rate of heat transfer during the molding process can change the thickness of the skin. In some cases it may be desirable to optimize the skin thickness, since increased skin thickness results in articles having more surface strength. However, skins of increased thickness are also generally more rigid and more likely to fracture if mechanically deformed.

In general, the skin thickness is directly proportional to the rate of heat transfer from the molds to the starch-based mixture. Increasing the rate of heat transfer generally increases the skin thickness; reducing the rate of heat transfer generally reduces the skin thickness. In like fashion, the rate of heat transfer from the molds to the starch-based mixture is directly proportional to the temperature of the molds. Increasing the mold temperature increases the rate of heat transfer, while reducing the mold temperature reduces the rate of heat transfer. Hence, increasing the mold temperature generally results in increased skin thickness, while reducing the mold temperature generally results in decreased skin thickness. However, it is virtually impossible to heat different parts of an integrally formed metal mold to different temperatures in order to alter the skin thickness throughout the molded article.

D. Mold Apparatus For Forming Thinner Interior Skin Portion.

In order to mold the article such that interior skin portion of the hinge area has reduced thickness, the present invention preferably utilizes specially designed molds in which the portion of the mold surface corresponding to the interior skin portion of the hinge transfers less heat per unit of time compared to the rest of the mold. In a preferred embodiment, the mold area corresponding to the interior skin portion of the hinge comprises a material having a heat diffusivity that is less than the heat diffusivity of the surrounding mold.

Heated molds 60 are preferably formed from materials, such as metals, that enable heat to be relatively rapidly transferred. Examples of suitable materials include, but are not limited to, aluminum, steel, and cast iron. The portion of the mold surface corresponding to the interior skin portion of the hinge is preferably formed from a high temperature plastic or ceramic that transfers heat less rapidly than the surrounding mold. The mold portion is also preferably formed from a material that is machineable and durable. Examples of suitable materials for transferring less heat than the surrounding mold include, but are not limited to, polyether ether ketone (PEEK), $Al_2O_3$, glass-fiber-reinforced Teflon, porcelain, silicone, rubber, or ceramics. Nevertheless, any combination of materials is within the scope to the extent that the materials result in an interior skin portion of the hinge having reduced thickness.

Figure 3:
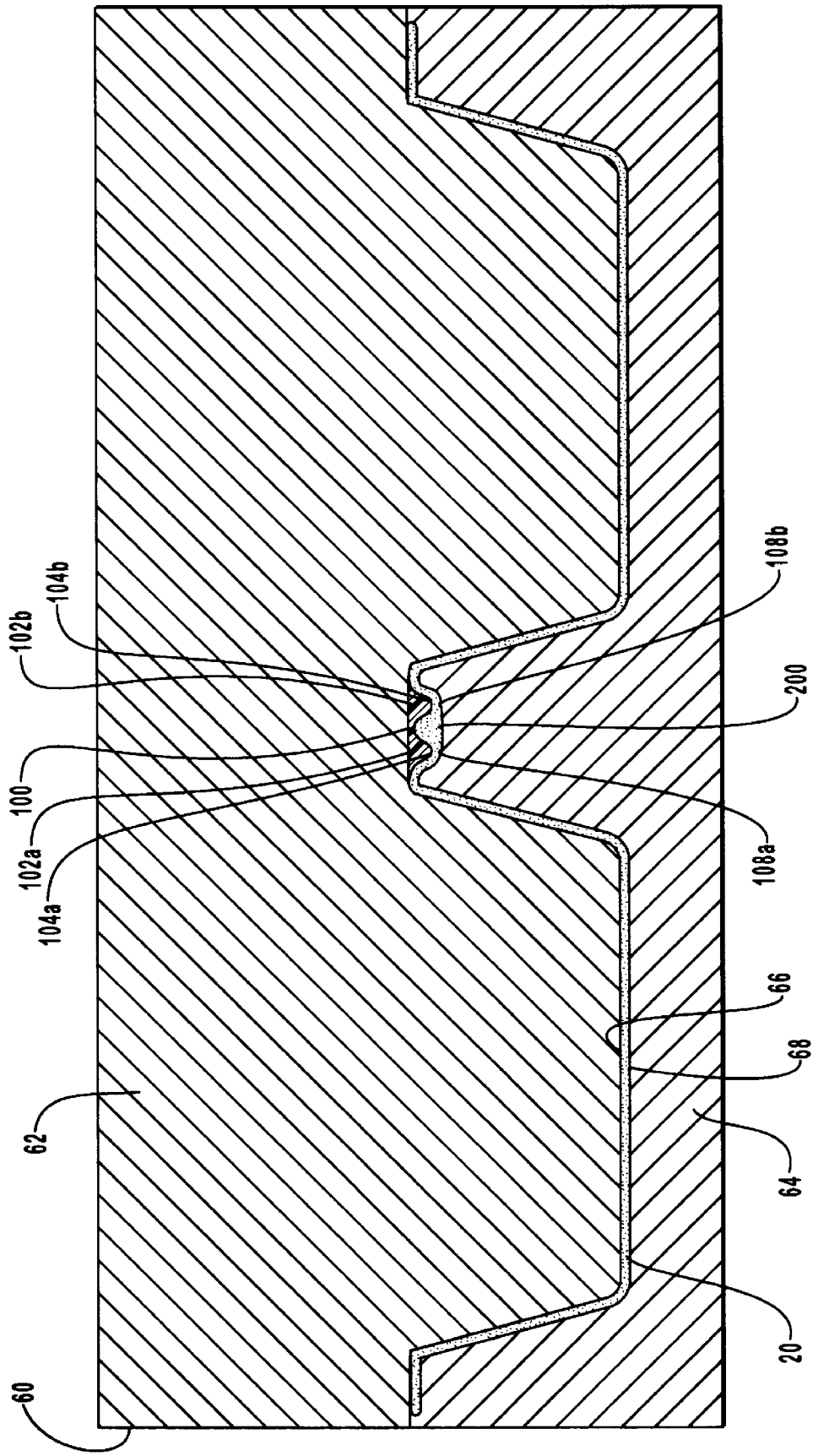
FIG. 3 is a cross-sectional view of a mold depicted in FIG. 2 showing a mixture being molded to have a hinge with a section of interior skin that is thinner than the opposing exterior skin.

An example of a mold configuration designed to form a hinge having an interior skin portion of reduced thickness is shown in FIG. 2 and is best viewed in FIG. 3 which is a cross-sectional view of one of the molds 60 shown in FIG. 2 after male mold 66 and female mold 68 have been coupled to mold mixture 80 into an article 20. A molding strip 100 having lower heat diffusivity is shown in contact with and adjacent to male mold 66. More particularly, molding strip 100 is connected to and extends from male mold 66.

Molding strip 100 has a bottom portion anchored within male mold 66 and a top portion extending from and beyond the surface of male mold 66. The top portion comprises two substantially parallel protrusions or ridges 102a and 102b which extend outward towards female mold 68. Extensions 102a and 102b are terminated at tips 104a and 104b respectively. Tips 104a and 104b align with two small substantially parallel projections or nibs 108a and 108b that extend from female mold 68. Tips 104a and 104b do not touch nibs 108a and 108b when the mold is in the closed position as shown, as they are offset from each other at a set distance.

Molding strip 100 is shaped or configured to cause an impression to be formed in an article molded between male mold 66 and female mold 68. Molding strip 100 has a thermal diffusivity that is less than the thermal diffusivity of male mold 66 thereby enabling an article to be formed with a crease and at least one section of thin skin at the crease, the thin skin section being a section of skin that is thinner than the skin on the opposing side of the article or sections adjacent to the thin section. The slower heat transfer along molding strip 100 enables the starch-based mixture to form more slowly yielding a thinner skin in the article at the area of the article formed opposite molding strip 100.

Male mold 66 and female mold 68 are preferably formed from the same material, while molding strip 100 is preferably formed from a material having a lower heat diffusivity or conductivity than male mold 66 or female mold 68, such as polyether ether ketone (PEEK), $Al_2O_3$, glass-fiber-reinforced Teflon, porcelain, silicone, rubber, or a ceramic. The harder the material, the more easily it can be machined to form the desired groove forming ridge within the molding strip 100 and the more durable it will be when used to mold articles. Molding strip 100 is an example of a means for forming a thin skin by transferring less heat to the starch-based mixture than either of male mold 66 and/or female mold 68. In many cases, it will be preferred to spray the molding strip 100 with a silicone or other adhesion reducing liquid during the molding process in order to reduce sticking of the molded starchbased article to the molding strip 100.

Nevertheless, any mold configuration that is able to reduce the rate of heat flow or transfer to the interior skin portion of the hinge within the molded article such that the interior skin portion has reduced thickness compared to the skin thickness in other portions of the article is within the scope of the present invention. For example, another way to reduce the flow of heat to the interior skin portion of the hinge is to incorporate within a mold apparatus of uniform material a molding strip 100 having reduced thickness. Because the specific heat and heat diffusivity of the mold apparatus material is uniform throughout the mold, the molding strip 100 will have a lower heat capacity due to its reduced thickness. Because of this, the molding strip 100 will have a lower reservoir of heat such that it will transfer less heat during the initial skin formation stage compared to the thicker portions of the mold. The practical effect would be that molding strip 100 would cool down more quickly as a result of the evaporation of water compared to the rest of the mold.

Another way to reduce the flow of heat to the interior skin portion of the hinge area would be to coat or laminate the molding strip 100 with a material that has lower heat diffusivity or heat conductance such that the flow of heat is impeded. Such coatings include, but are not limited to, Nedox (Teflon impregnated with nickel) and Tufram (aluminum oxide infiltrated with Teflon).

Yet another way to reduce the flow of heat to the interior skin portion of the hinge area would be to thermally isolate the molding strip 100 from the rest of the mold and then provide separate heating means for selectively heating the molding strip 100 to a lesser degree than the rest of the mold.

IV. DESIGNS AND FEATURES OF INVENTIVE HINGES.

The design of hinged articles within the scope of the present invention involves selection of a particular mixture of the above materials in combination with the selection of a hinge design based on the desired final properties. The desired final properties are determined primarily based on the intended use of the article. The hinge can comprise a single hinge or a multiple hinge depending on the desired bending and performance criteria of the particular article. A single hinge will experience stress over the entire bending angle of the hinge. In a double hinge, each hinge unit will only be bent about half the distance of the overall bending angle of the hinge, while each hinge unit in a triple hinge will only be bent about one-third of the distance of the overall bending angle of the hinge. For a clamshell container, which is required to bend about 180°, it is presently preferred to use a double hinge such that each hinge unit is required to bend about 90°, or half of the overall bending angle or distance of the hinge.

The less a hinge or hinge component must bend during the bending action the less stress is applied to the hinge, particularly in compressing the interior skin portion of the hinge and in elongating the exterior skin portion during the bending action. In general, multiple hinges are more durable than single hinges since each unit will only be required to bend over a fraction of the overall bending angle. In this way, the mechanical stresses are distributed over a larger area of the hinge. Altering the mold apparatus to manufacture articles having multiple hinges is simply a matter of including one or more additional mold structures that will form one or more additional creases within the hinge structure.

Selecting the desired multiple of hinge units is a matter of having enough hinge units to distribute the mechanical stresses associated with the bending action, while not having so many hinge units that the hinge becomes clumsy or in which the bend angle is so unevenly distributed between the hinge units that one or more of the hinge units does not function or serve any purpose. The design and intended use of the hinged article is a factor in selecting a particular design. Most hinged containers must be at least sufficiently durable to remain closed without failure after being closed. While a hinge that can only be closed once is sufficiently durable for certain uses, hinges preferably are sufficiently durable to be repeatedly opened and closed.

Figure 4:
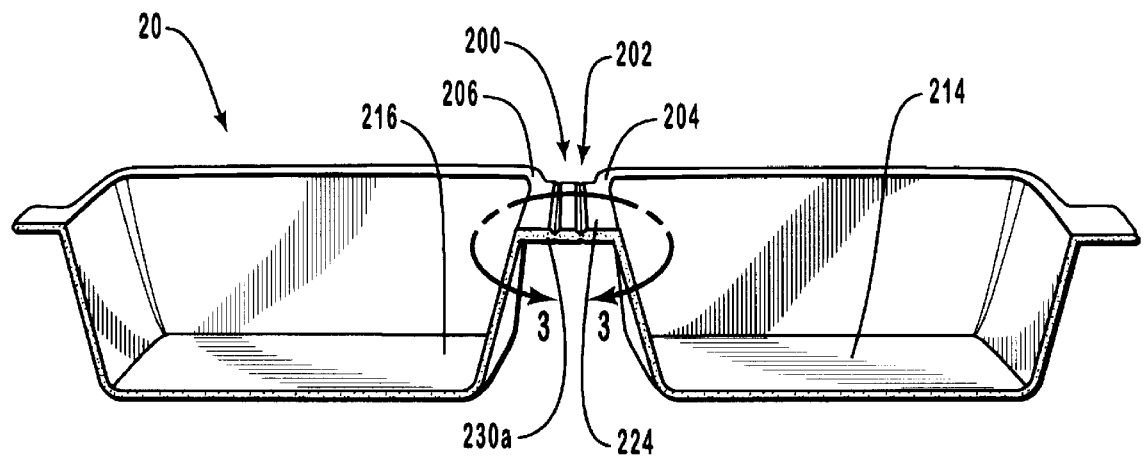
FIG. 4 is a perspective view of an open clam-shell container having a double hinge.
Figure 5:
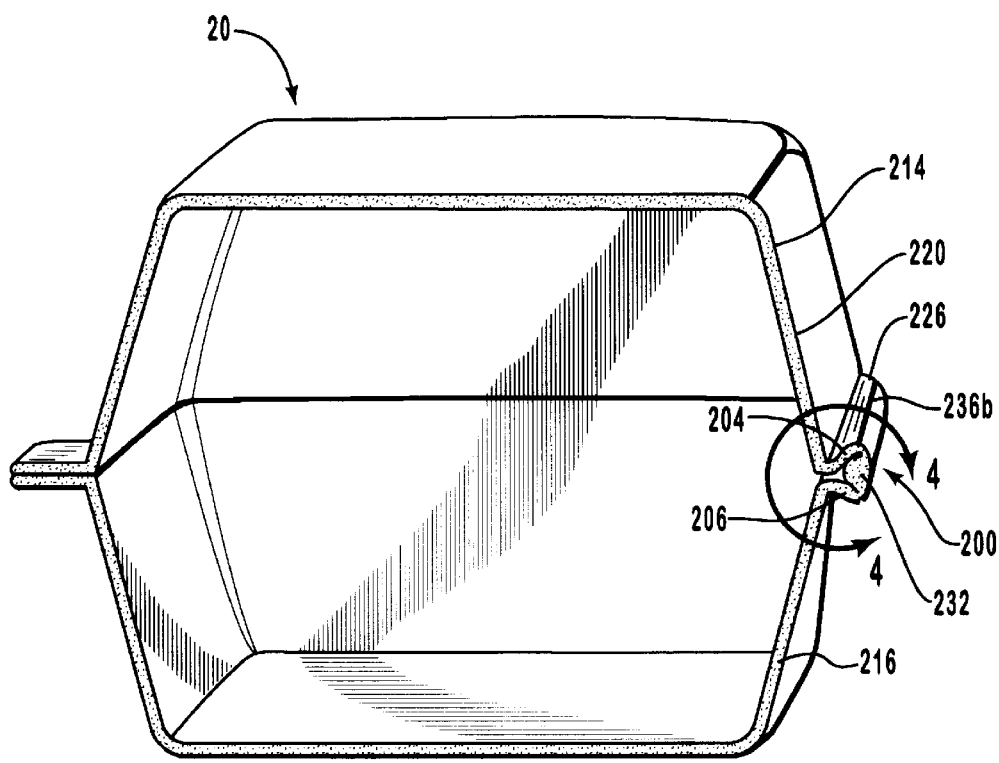
FIG. 5 is a perspective view of the double-hinged clam-shell container after being closed so that the hinge has been folded.

FIGS. 4–7 depict one embodiment of the present invention, which is a container having a hinge structure with two creases. FIG. 4 is a perspective view of an open clamshell container depicting a double creased hinge structure. FIG. 5 is a perspective view of the clam-shell container in FIG. 4 in a closed position. Article 20 of FIGS. 1–5 is a clamshell container 20, which is an example of a hinged container that must be at least sufficiently durable to remain closed without failure after being closed once and that can preferably be opened at least once without failure. However, this and other containers disclosed herein are preferably sufficiently durable so that they may be opened and closed several times.

The clam-shell container 20 has a hinge structure or unit 200. Hinge structure 200 comprises three integral segments including a flexible bending region 202 between a top arm 204 and a bottom arm 206. Top arm 204 and bottom arm 206 are more rigid than flexible bending region 202. Top arm 204 is also an integral segment of a top 214 of container 20 and bottom arm is also an integral segment of bottom 216. Accordingly, top 214 of container 20 and bottom 216 of container 20 are integrally connected by hinge structure 200. This hinge structure is an example of a hinging means for opening and closing the container by pivoting the top and bottom relative to each other at the hinge means over a bending angle.

Figure 6:
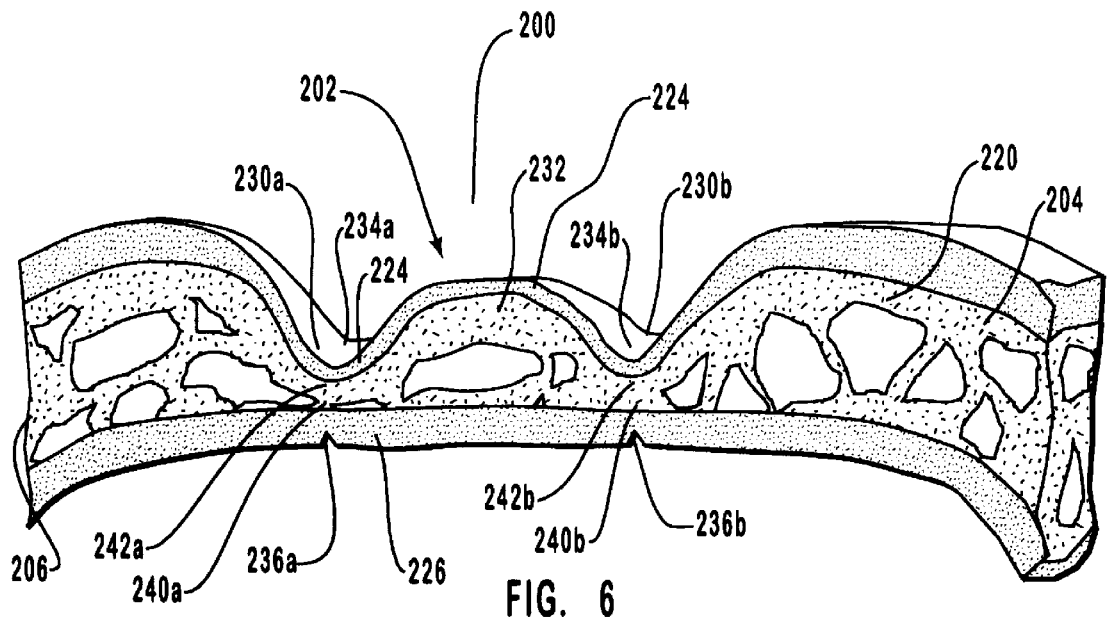
FIG. 6 is an enlarged view of a schematic cross-sectional and perspective view of the unfolded hinge depicted in FIG. 4.
Figure 7:
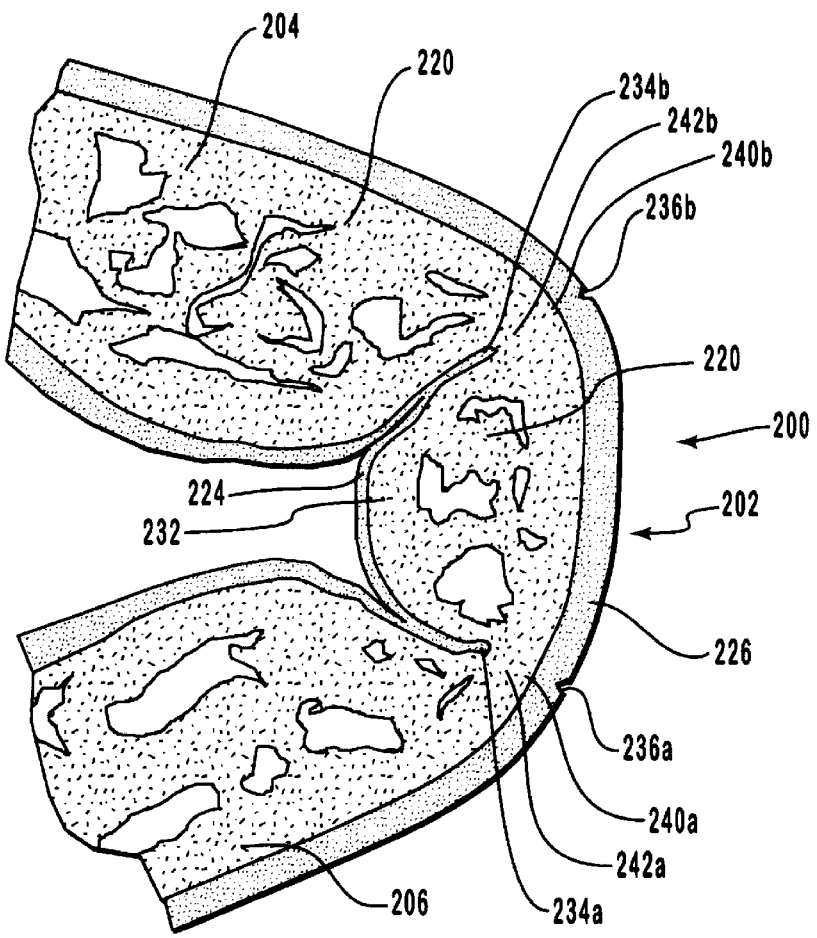
FIG. 7 is an enlarged view of a schematic cross-section and perspective view of the folded hinge depicted in FIG. 5.

FIG. 6 is an enlarged schematic depiction of a cross-section of hinge structure 200 shown in FIG. 4 in an open position. FIG. 7 is an enlarged schematic depiction of a cross-section of hinge structure 200 after being folded into a closed position as shown in FIG. 2.

The cross-sectional views shown in FIGS. 6 and 7 depict the starch-bound cellular matrix of hinge structure 10. The starch-bound cellular matrix has an inner cellular core 220 between an interior skin portion 224 and an exterior skin portion 226. Inner cellular core 220 is distinguishable from interior skin portion 224 and exterior skin portion 226 since inner cellular core 220 has a porosity that is substantially greater than the porosity of interior skin portion 224 and exterior skin portion 226. Consequently, interior skin portion 224 and exterior skin portion 226 are substantially denser than inner cellular core 220.

Two substantially parallel depressions or creases 230a and 230b are located within hinge structure 200. Creases 230a and 230b are formed into the starch-bound cellular matrix on the same side of the hinge structure 200 as the interior skin portion 224. Hence, creases 230a and 230b are disposed directly within interior skin portion 224. Creases 230a and 230b provide clean bending lines upon which hinge 200 will bend and interior skin 224 will collapse or buckle during closure of container 20.

Creases 230a and 230b are spaced apart by a swell 232, which is also within interior skin portion 224. Creases 230a and 230b and the area of hinge structure 200 surrounding creases 230a and 230b, such as swell 232, define bending region 202.

The interior skin portion 224 has a thickness at and around creases 230a and 230b that is less than the thickness of exterior skin portion 226, particularly the section of exterior skin 226 that is opposite crease 230a and 30b. In general, the thickness of interior skin portion 224 within the entire bending region 202 will be less than the thickness of exterior skin portion 226 in the bending region 202.

Each crease also includes a base point. The base points of creases 230a and 230b are identified as 234a and 234b. Opposite base point 234a and 234b are two substantially parallel shallow grooves 236a and 236b within exterior skin portion 226, which are much more shallow compared to creases 230a and 230b. The grooves 236a and 236b act as bending initiators during the bending action by providing elongation distribution in a desired localized area of exterior skin portion 226.

The bendability of hinge structure 200 is best viewed in FIG. 7 which schematically depicts a cross-section of hinge structure 200 after being folded into a closed position. A substantial portion of bending region 202 experiences either compression or elongation as hinge structure 200 is folded by pivoting arms 204 and 206 towards each other.

Although, most of bending region 202 moves during folding, the greatest movement is experienced at or around the respective regions in between base points 234a and 234b and grooves 236a and 236b which are necks 240a and 240b. More specifically, the most substantial compression of the interior skin portion 224 and elongation of the exterior skin portion 226 is experienced in the area of necks 240a and 240b. The thickness of necks 240a and 240b is preferably optimized based on the mixture and hinge design to enable inner cellular core 220 to compress during folding of the hinge and exterior skin 226 to elongate without rupturing. To minimize the compression and stress experienced in bending region 202, necks 240a and 240b are preferably significantly thinner than adjacent sections such as arms 204 or 206 or swell 232.

The relative thickness of necks 240a and 240b is best described by reference to the thickness of inner cellular core 220 at necks 240a and 240b compared the thickness of inner cellular core 220 in other sections of hinge structure 10, such as arms 204 and 206. The thickness of inner cellular core 220 at necks 240a and 240b is significantly less than the thickness of inner cellular core 220 at arms 204 and 206 and is also generally less than in other areas of bending region 202. Any ratio of the thickness of inner cellular core 220 in arms 204 and 206 to the thickness of inner cellular core 220 in necks 240a and 240b is within the scope of the present invention; however, it is preferably in a range from about 1:10 to about 1:1.5, more preferably about 1:4 to about 1:2 and is most preferably about 1:3.

As shown in FIG. 6 and 7, the bending radius experienced by the exterior skin portion 226 is greatly reduced by virtue of the creases 230a and 230b. The bending radius is also further reduced as a result of the reduced thickness of the interior skin portion 224 at bending region 202 compared to creased hinges in which the interior skin portion does not have reduced thickness compared to the exterior skin portion 226. Reducing the bending radius of the hinge reduces the overall strain or elongation experienced by the exterior skin portion 226. The reduced thickness of the interior skin portion 224 at bending region 202, more specifically at creases 230a and 230b, enhances the ability of the interior skin portion 224 to compress, which in turn reduces the strain on the exterior skin portion 226 when the hinge structure is bent.

In general, the radius of bending of the hinge structure will preferably be in a range from about 0.005" to about 0.050", more preferably in a range from about 0.010" to about 0.035", and most preferably in a range from aout 0.015" to about 0.025".

The general shape of hinge structure 10 results from the shape of the mold utilized to form hinge structure 10, while the thickness of the skin results from utilizing a mold that removes water more slowly in the area where it is desired to have a thinner skin, such as the interior side of a hinge.

In addition to utilizing at least two substantially parallel creases as shown in FIGS. 4–7, a single crease or additional creases can also be utilized. A hinge having one crease or multiple creases defines a flexure line or a vertex of a bending angle when viewing the movement of top 214 of container 20 relative to the movement of bottom 216 of container 20. The location of the vertex depends on the particular design and the number of creases utilized. When multiple creases are utilized then the location of the flexure line or vertex is related to the location of at least two pivot point areas, since the arms can pivot at two locations. FIGS. 6 and 7 depict for example two pivot point areas 242a and 242b which are located in each respective neck and around the base of each respective crease at which the arms pivot.

A hinge structure formed with three creases to have a similar design as hinge structure 200 would have an additional swell 234 to provide a spacer between each crease and would have three pivot point areas. It is also within the scope of the present invention to form a hinge structure with multiple creases and without a swell between pairs of creases by positioning the creases in an abutting position.

V. POST-FORMATION TREATMENTS.

A. Treating the Interior Skin Portion of Hinge Area with Glycerin or Other Polyols to Improve Collapsibility.

The interior skin preferably includes softening means for enhancing the ability of the interior skin to compress, collapse, or buckle. An example of a softening means is a polyol in contact with the interior skin. Accordingly, the interior skin portion of a hinge is preferably treated with a polyol, including polyol solutions such as aqueous glycerin. A presently preferred polyol is glycerin due to its effectiveness, low cost, solubility in water, and ease of application. Nevertheless, any other polyol that can act to soften the interior skin portion of the hinge is within the scope of the present invention. Other useful polyols include, but are not limited to, polyethylene glycols, propylene glycol, polypropylene glycols, and sorbitol. While ethylene glycol would also be expected to work, it should not be used in containers that will come into contact with food or beverages due to its toxicity.

Polyols such as glycerin act to soften and plasticize the interior skin portion, or any other treated portion, which enhances the ability of the interior skin to compress, fold, or collapse. The softening and plasticizing effect of the polyol treatment is permanent if nonvolatile polyols are used, even if the container is later exposed to wide variations in ambient relative humidity. Enhanced compression and collapse of the interior skin portion of the hinge makes it more resilient and durable such that the interior skin portion can be repeatedly collapsed or buckled and then reextended without fracture of the interior skin portion.

Moreover, making a more easily collapsible interior skin portion benefits the exterior skin portion by reducing the elongation of the exterior skin, since a more easily collapsed interior skin portion results in a shorter bending radius for the exterior skin portion. This reduces the strain on the exterior skin portion, which decreases the tendency for fracture of the exterior skin portion and increases the life of the hinge.

Polyols are generally hygroscopic and function as humectants by regulating the moisture content within the starch after a starch-based article is treated. More specifically, the polyol enables the starch-based article to absorb and/or retain a desired amount of moisture under ambient conditions depending on the amount of polyol used to treat the article. In general, any polyol will enable the starch-based article, more particularly the skin of the starch-bound cellular matrix, to retain more moisture under ambient conditions than articles not treated with a polyol.

Polyols also act to stabilize the structure of the starch-bound cellular matrix. After a starch-bound article has been treated with a polyol it will tend to more reliably resist warping or other dimensional changes if further subjected to surface moisture, such as steam or liquid water. Further exposure to surface moisture may result from high relative humidity, contact with food or beverages, or through the application of water-based coatings.

While it is within the scope of the present invention to use 100% glycerin or other polyol, the glycerin is preferably diluted by water, which enhances the ability of the polyalcohol to penetrate into the starch-based article. In general, optimum penetration occurs when the viscosity of the glycerin solution is reduced to below about 10 cps by means of diluting the glycerin with water. In addition, the water is immediately available to increase the moisture content of the starch-bound matrix. Accordingly, a preferred aqueous glycerin composition comprises at least about 15% glycerin by weight of the aqueous solution, and more preferably at least about 25% glycerin by weight of the aqueous solution. As long as the glycerin is included in an amount of at least about 15%, the article will be stabilized against the tendency of the water to cause warping of the article.

Any coating technique known in the art is within the scope of the present invention and may be used to apply glycerin or other polyols to the starch-based articles, particularly the interior skin portion of the hinge. The glycerin may be applied, for example, by spraying or painting glycerin onto the surface or dipping the article into a vat containing glycerin.

In general, the amount of glycerin applied to the surface of the molded starch-bound articles, particular the interior skin portion of the hinge, will be within a range from about $1 \times 10^{-4}$ g/cm$^2$ to about $4.5 \times 10^{-4}$ g/cm$^2$, more preferably in a range from about $1.5 \times 10^{-4}$ g/cm$^2$ to about $2.5 \times 10^{-4}$ g/cm$^2$.

Accordingly, for a clam shell container used to serve hamburgers, it is presently preferred to apply about 0.05 g of a 50/50 mixture of glycerin and water to the interior skin portion of the hinge such that it is treated with about 0.025 g glycerin net.

Glycerin is most economically applied as a liquid at ambient conditions; however, it can also be applied at elevated temperatures. In one embodiment of the present invention, the glycerin is applied to a starch-based article at approximately the same temperature at which the article is formed. It is also within the scope of the present invention to reheat the starch-based articles that have been formed and allowed to cool to ambient conditions. For starch-based articles formed using the preferred compositions and methods set forth above, penetration of the glycerin is optimized when the article has a temperature in a range from about 80° C. to about 90° C. and when the glycerin is heated to a temperature in a range from about 80° C. to about 9° C.

In general, the treated articles are ready for use or may be further treated immediately or shortly after treatment with glycerin. However, if aqueous solutions including higher concentrations of water are used, it may be desirable to subject the article to further drying prior to further treatment or use.

B. Application of Elastomeric Coatings to Strengthen the Exterior Skin Portion of Hinge Structure.

The exterior skin portion of the hinge preferably includes strengthening means for enhancing the ability of the exterior skin to elongate with fracture. An example of a strengthening means is an elastomeric coating on the exterior skin portion of the hinge such as polyvinyl alcohol. Polymeric coatings provide reinforcement to reduce the tendency of the hinge to fracture due to strain and elongation of the starch-bound cellular matrix. This increases the life of the hinge. Elastomeric coatings also serve to hold the exterior skin portion of the hinge together if minor fractures do actually occur in the starch-bound cellular matrix. The elastomeric coatings can be applied using any coating apparatus or means known in the art.

Additionally, polymeric coatings block the entry of moisture into the exterior skin portion, thereby proving structural and surface protection from deformation, collapse, or rupture as a result of destructive levels of moisture to which the hinged article may be exposed. The elastomeric coating further helps to retain moisture within the starch-bound matrix in order to maintain a desired level of softness and durability such that the hinge does not become over dried and brittle over time.

The elastomeric coatings are preferably water-based and comprise either a synthetic or natural polymer. The elastomeric coating is preferably nontoxic if used in containers and packaging materials that will come into contact with food or beverages. Examples of elastomeric coating materials within the scope of the present invention include polyvinyl alcohol, polylactic acid, natural latex, and mixtures thereof. The elastomeric coating is preferably water-soluble or a water-borne emulsion such that it can be applied by means of an aqueous solution or emulsion. The water-based elastomeric coating material may optionally include a polyol such as glycerin for increased stabilization of the starch-bound matrix to which the elastomeric coating is applied. It is also within the scope of the present invention to include inorganic fillers, such as kaolin, silica fume, calcium carbonate, or talc to decrease the glossiness of the coatings. If included, the silica fume preferably has a concentration in a range from about 0.25 to about 3% by weight of the coating composition, more preferably in a range from about 0.5% to about 1.5% by weight.

For a clam shell container used to serve hamburgers, it is presently preferred to use an aqueous polyvinyl alcohol coating material that includes 60% polyvinyl alcohol, 20% plasticizer (such as urea), and 20% water such that about 0.2 g to about 1.8 g of coating materials is applied to the article, more preferably in a range from about 0.3 g to about 1.2 g, and most preferably in a range from about 0.4 g to about 0.8 g. Presently, it is preferred to use a proprietary polyvinyl alcohol coating material that includes an unknown plasticizer obtained from Planet Polymer. The coating material is preferably diluted with about 20% water.

VI. EXAMPLES OF THE PREFERRED EMBODIMENTS.

Outlined below are examples of the present invention and comparative examples setting forth the results of experiments involving articles with a starch-bound cellular matrix having a hinge or a flexible region. The examples include tests of different physical configurations as well as the impact of post-formation treatments, such as glycerin treatment of the interior skin portion of the hinge or application of a polymeric coating to the exterior skin portion of the hinge.

EXAMPLE 1

A hinge was formed by molding a starch-based mixture in an aluminum two-piece mold. The two-piece mold included an aluminum male mold with a polyether ether ketone molding strip corresponding to the interior surface of the hinge structure. The molding strip had two 90° "V"-shaped extensions or a "W"-shaped extension. The "W"-shaped extension was essentially two parallel ridges. The aluminum female mold had two small projections that aligned with the tips of the "W" but did not touch the tips when the mold was closed.

Figure 8:
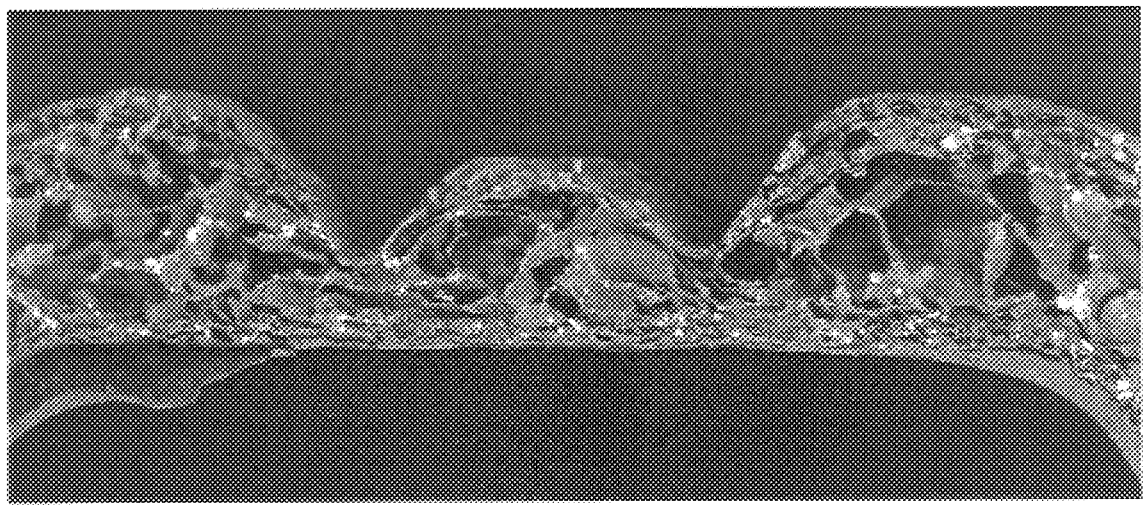
FIG. 8 is a scanning electron micrograph image of a cross-section of an unfolded hinge formed from a starch-based mixture.

A scanning electron micrograph image of a cross-section of the hinge formed from the starch-based mixture is shown in FIG. 8. The hinge is shown in a straight position before being folded. The top surface of the hinge in FIG. 8, which is the interior skin of ii the hinge, is formed by the "W"-shaped polyether ether ketone extension. Due to the low heat conductivity or high insulation properties of the polyether ether ketone compared to the aluminum surfaces of the mold, the interior skin portion of the hinge is thinner than the exterior skin portion of the hinge in FIG. 8.

Figure 9:
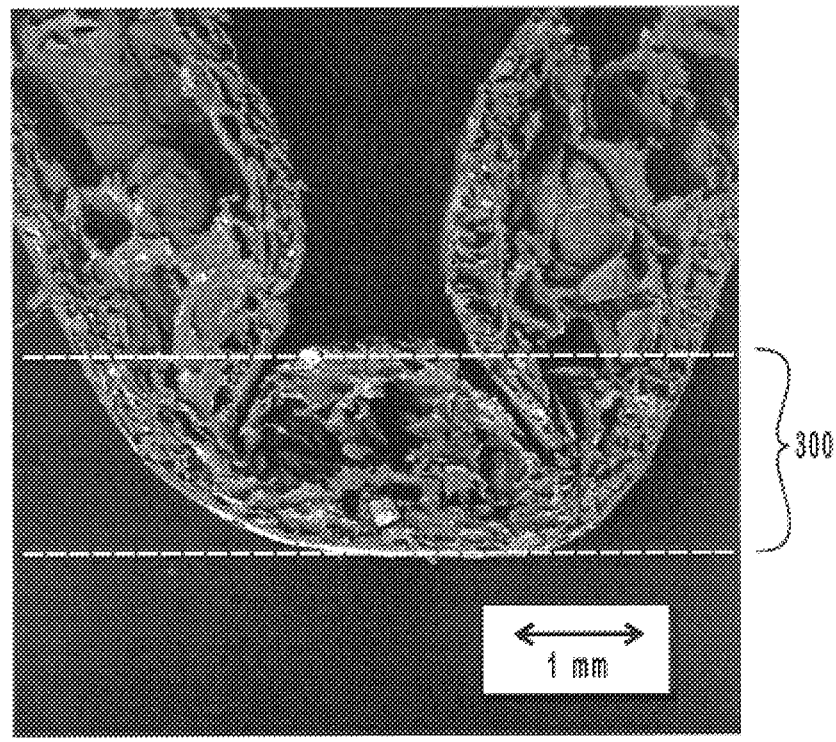
FIG. 9 is a scanning electron micrograph image of a cross-section of the hinge shown in FIG. 8 after being folded.

After the hinge was formed, the exterior skin of the hinge was coated with a thin layer of polyvinyl alcohol. A small amount of glycerin was applied to the interior skin of the hinge. The hinge was then bent as shown in FIG. 9, which is scanning electron micrograph image of a cross-section of the bent hinge. FIG. 9 has dotted lines roughly delineating the segment 300 of the article that experiences the most compression and elongation as the hinge is folded. Portion 300 roughly corresponds to bending region 202.

The configuration of the bent hinge in FIG. 9 shows that the interior skin in segment 300 is able to compress without substantial fracture and that the exterior skin does not rupture as it elongates. The glycerin apparently acts as a plasticizer or softener to further enhance the ability of the thin interior skin to compress while the polyvinyl alcohol enhances the ability of the exterior skin to elongate without rupture. The hinge was opened and closed several times without failure, thus demonstrating that the hinge is sufficiently durable for repeated use. Accordingly, the test determined that problems associated with forming a hinged starch-based article in a metal mold were overcome by varying the rate of heat transfer in the mold to create a portion of the hinge having a thinner skin, and then enhancing the bendability of the hinge by treating the interior skin with glycerin and coating the exterior skin with a polyvinyl alcohol coating.

EXAMPLE 2

Figure 10:
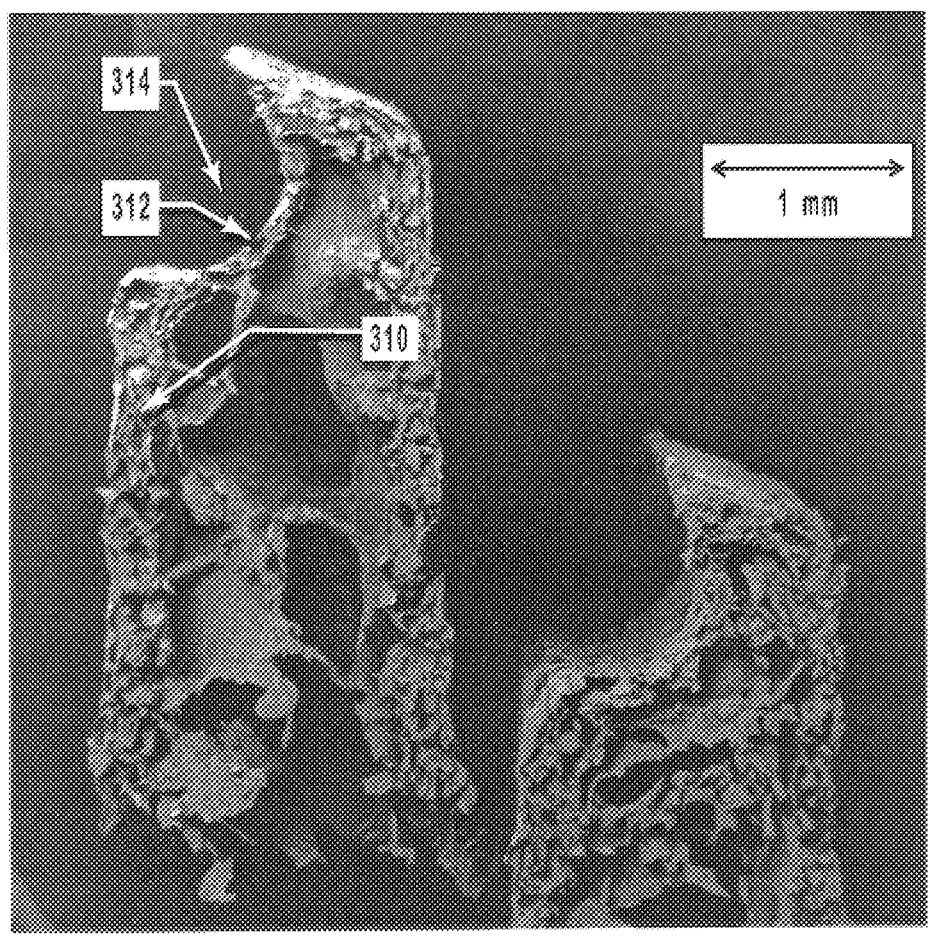
FIG. 10 is a scanning electron micrograph image of a cross-section of an article molded in an aluminum mold having a silicone member.

A starch-based mixture was molded in a mold formed from aluminum with a rounded segment made from silicone rubber to identify the result on skin thickness of molding a mixture in a mold having two different surface materials. A scanning electron micrograph image of a cross-section of the article formed in the mold is shown in FIG. 10. The thickness of the skin 310 of the article in contact with the aluminum was measured and found to be about 250 μm. The thickness of the skin 312 of the article in contact with the silicone was measured and found to be about 100 μm. The position of the silicone member during molding is identified by numeral 314. The experiment indicated that the difference in the thermal conductivity of the aluminum and silicone rubber yields a wall thickness ratio of about 2.5:1.

Comparative Example 1

An experiment was conducted on a strip or sheet having a starch-bound cellular matrix and having an interior skin that was approximately as thick as the exterior skin to observe the bendability of hinge in the strip after the interior skin was coated with glycerin. The interior skin and the exterior skin of the strip had comparable thickness as the strip was formed in a mold having only an aluminum surface and without any structure for forming indentations or grooves. The glycerin was brushed onto the interior skin of the starch-based strip and allowed to soak in for about an hour to enhance the ability of the interior skin of the to buckle.

Figure 11:
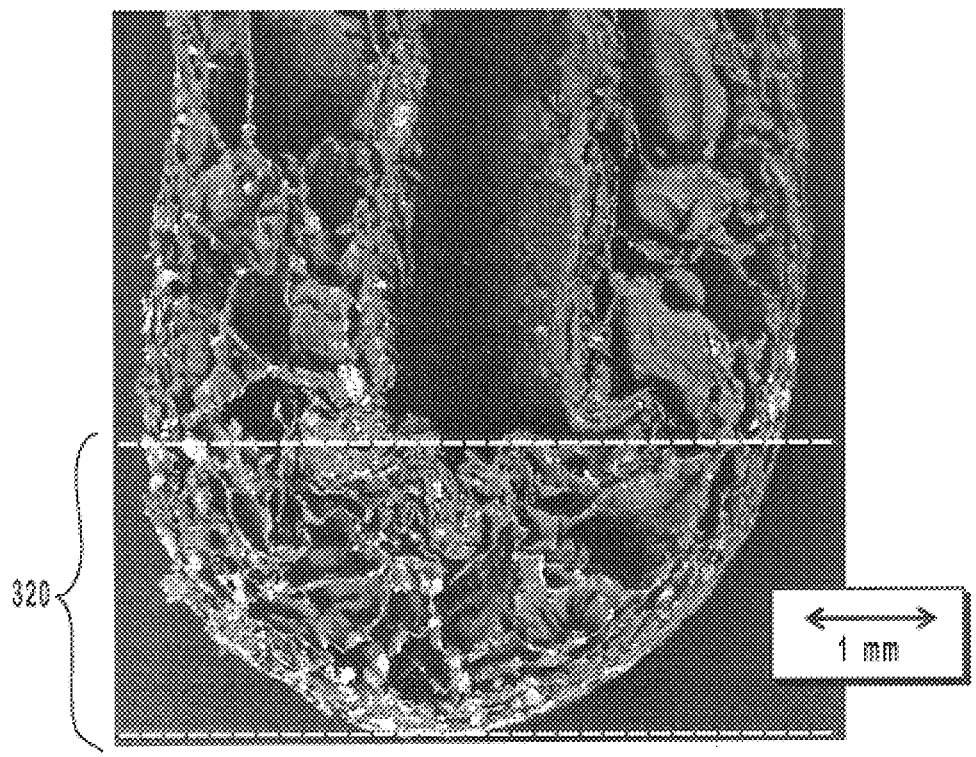
FIG. 11 is a scanning electron micrograph image of a cross-section of a hinge with a thick interior skin.

After the interior skin of the strip was treated with glycerin it was bent as shown in FIG. 11. FIG. 11 is a scanning electron micrograph image of a cross-section of the bent strip. FIG. 11 has dotted lines roughly delineating the portion 320 of the strip that experienced the most compression and elongation as the strip was folded. While the glycerin enhanced the buckling, it was found that the amount of glycerin necessary to cause sufficient buckling due to the thickness of the interior skin eventually conflicted with the functionality of the hinge as the hinge became excessively soggy, particularly when microwaved.

Figure 12:
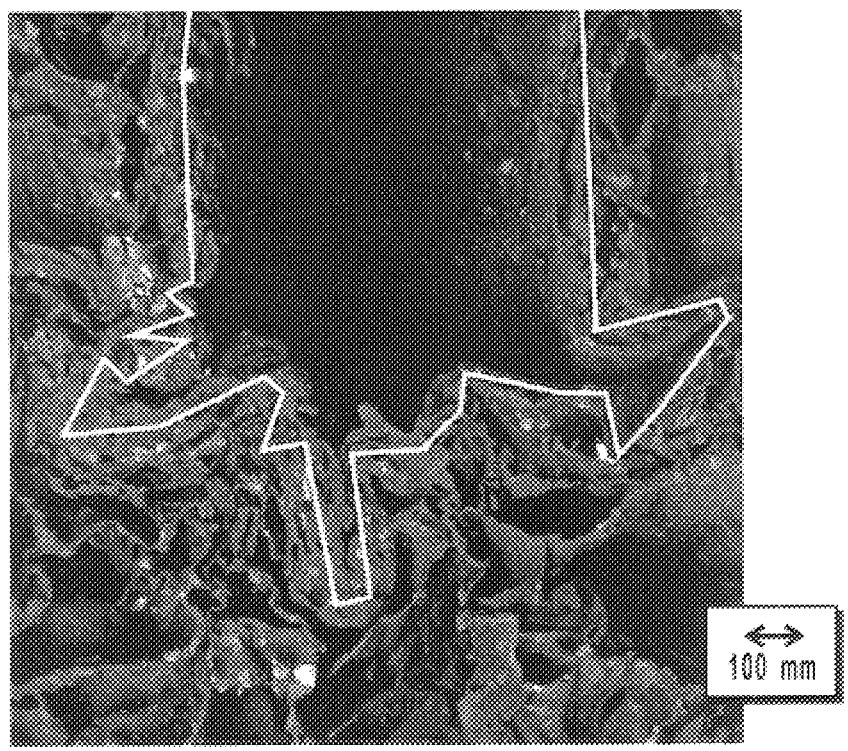
FIG. 12 is a higher magnification of the image shown in FIG. 11 with a white line outlining a rough trace of the interior skin to highlight the folding pattern.

FIG. 12 is a higher magnification of the image shown in FIG. 11, particularly the interior skin of the hinge, with a white line outlining a rough trace of the interior skin to highlight the excessive folding that occurred. FIG. 12 shows that the bending is not localized and tends to wander, thereby causing regional inconsistencies. Accordingly, it can be concluded that the need for glycerin can be avoided, or at least minimized, by reducing the thickness of the interior skin. It can also be concluded that the bending is not sufficiently controlled without a focal or pivot point formed by an indentation in the hinge.

Comparative Example 2

An experiment was conducted on a hinge in a container designed to have a localized bending point and having an interior skin that was approximately as thick as the exterior skin of the hinge to observe the bendability of hinge after the exterior skin was coated with polyvinyl alcohol. The localized bending point was obtained by forming two parallel indentations in the interior skin. The interior skin and the exterior skin of the hinge of the container had comparable thickness as the article was formed in a mold having an all aluminum surface. Polyvinyl alcohol was coated onto the exterior skin of the starch-based hinge.

Figure 13:
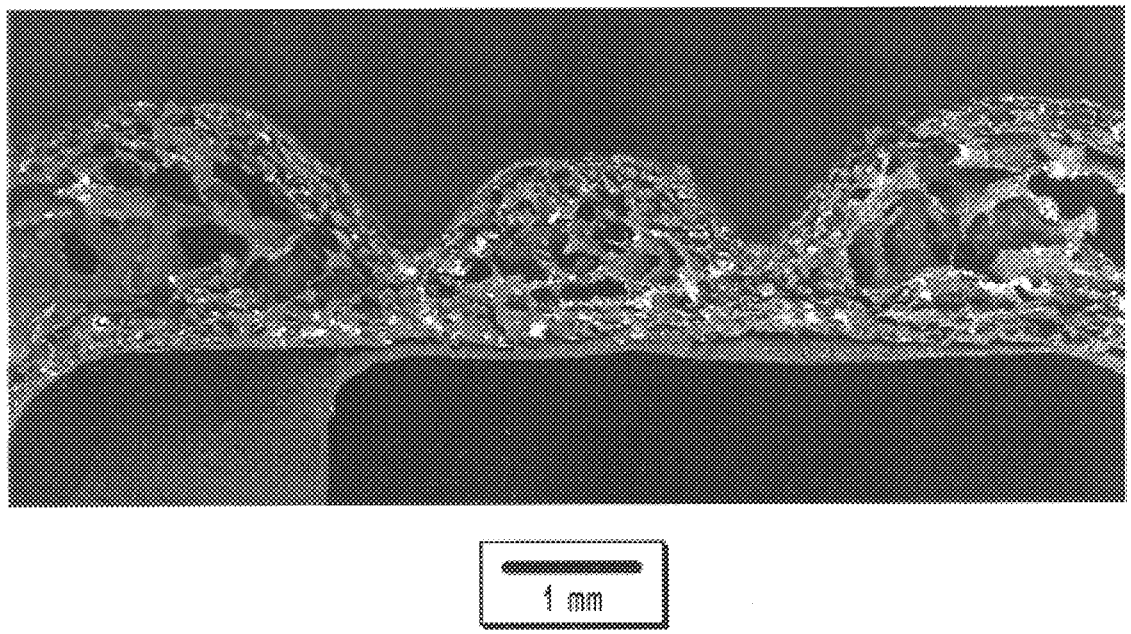
FIG. 13 is a scanning electron micrograph image of a cross-section of a hinge with a thick interior skin and two parallel indentations for localized folding.
Figure 14:
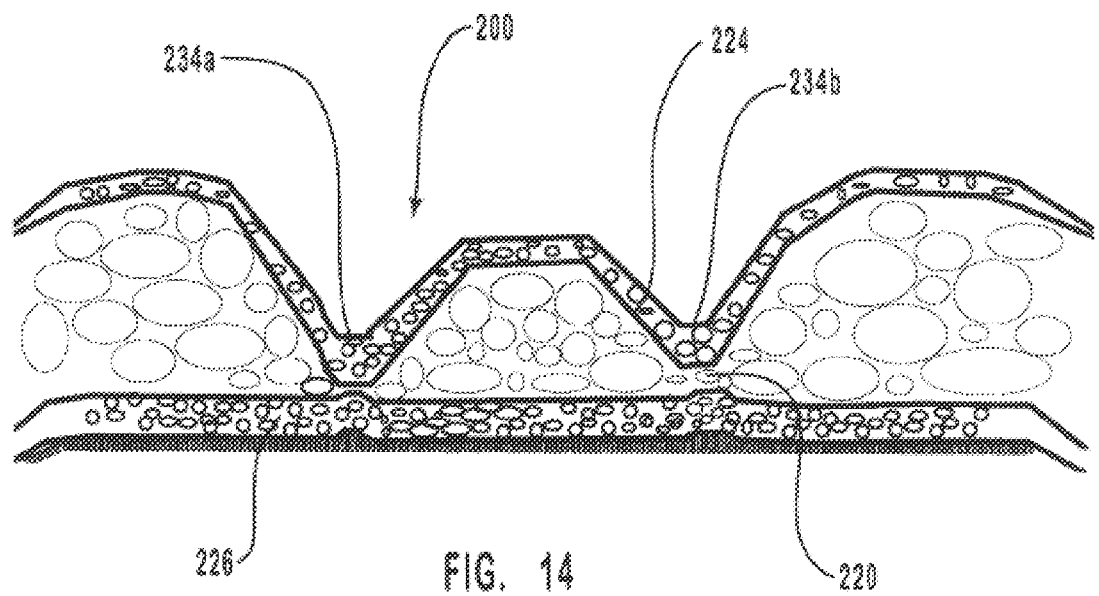
FIG. 14 is a schematic depiction of the image in FIG. 13.
Figure 15:
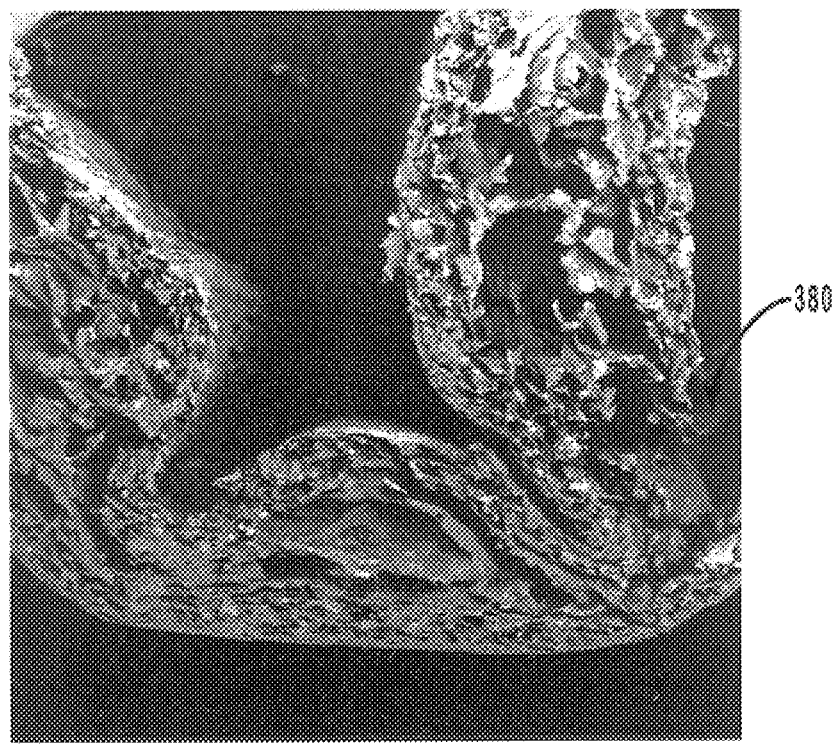
FIG. 15 is a scanning electron micrograph image of a cross-section of the hinge shown in FIGS. 13 and 14 after being bent.

FIG. 13 is a scanning electron micrograph image of a cross-section of the hinge before being bent. FIG. 14 is a schematic depiction of the image in Figure13 wherein the interior skin 224 or a portion thereof is clearly as thick or nearly as thick as exterior skin 226 of hinge 200. FIG. 13 also shows that inner cellular core 220 is relatively thin at the necks under bases 234*a* and 234*b*. FIG. 15 is a scanning electron micrograph image of a crosssection of the hinge after being bent.

FIG. 15 shows that the folding was localized; however, the hinge had poor performance. A fracture 380 occurred in the exterior skin as shown in FIG. 15. The fracture most likely occurred due to the relative thickness of the interior skin, which yielded a large bending angle thereby causing excessive strain on the exterior skin. The excessive strain may also have resulted in the fracture due to the inability of the cellular core 220 at under one or both of the bases of the creases to compress, since the cellular core was relatively thin or dense under the bases thereby limiting its ability to compress.

It can be concluded that a thick interior skin reduces the bendability of a hinge since it is difficult to collapse. Additionally, it can be concluded that the ability of a hinge to fold is enhanced by creating a point for localized folding when the folding point does not form a neck that is so thin and dense that the ability of the cellular core to compress is impaired.

EXAMPLE 3

Figure 16:
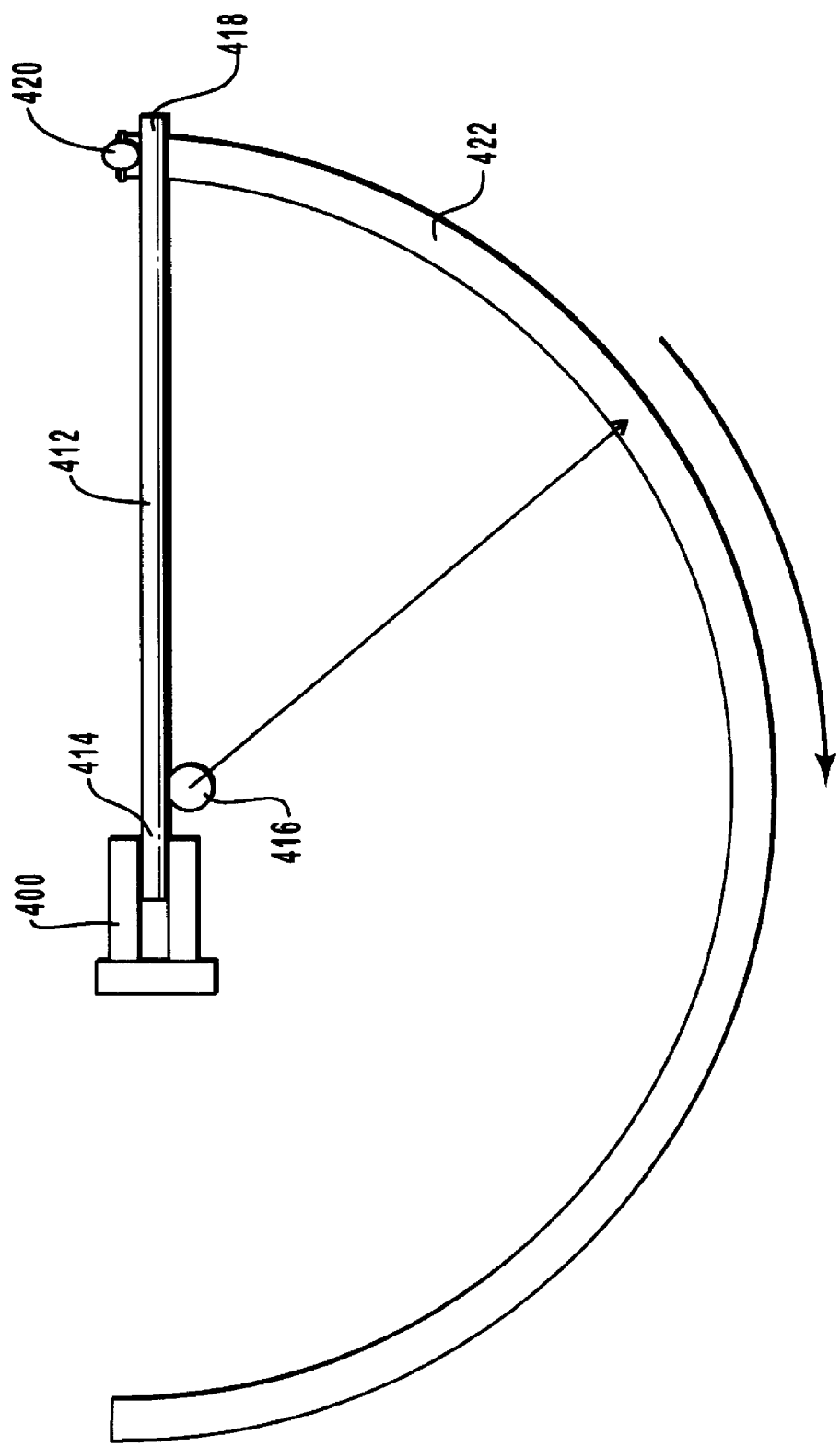
FIG. 16 shows a schematic diagram of an apparatus used to test the bendability of starch-bound matrix samples.

A bend angle test was developed to quantify the effect of glycerin on the flexibility of the starch-based hinges. FIG. 16 is a schematic diagram of the test apparatus utilized to measure the flexibility of starch-based hinges. The test involved utilizing a clamp 400 to hold a starch-based strip 412 of a foamed starch sheet at one end 414 and then bending strip 412 around a pin 416 by the application of moment at the other end 418 of strip 412 by a sliding pin 420 in a circular track 422. Circular track 412 has graduations for measurement of the bending angle. The bending angle over which the strips were bent before a crack was visually observed on the tensile face or the outer surface of the hinged portion of each strip was then manually noted.

The strips were excised from the base of a two-piece clam shell container having a starch-bound matrix. The dimensions of the strips were 15 mm×80 mm. The strips were sprayed at four levels of glycerin-water solution and allowed to equilibrate at three different relative humidity conditions. The strips had 0, 0.3 g, 0.6 g, and 0.8 g of solution and were conditioned at 15%, 40%, and 80% relative humidity. The samples were tested with the coated side in compression which was the inside surface as the strips were bent.

Figure 17:
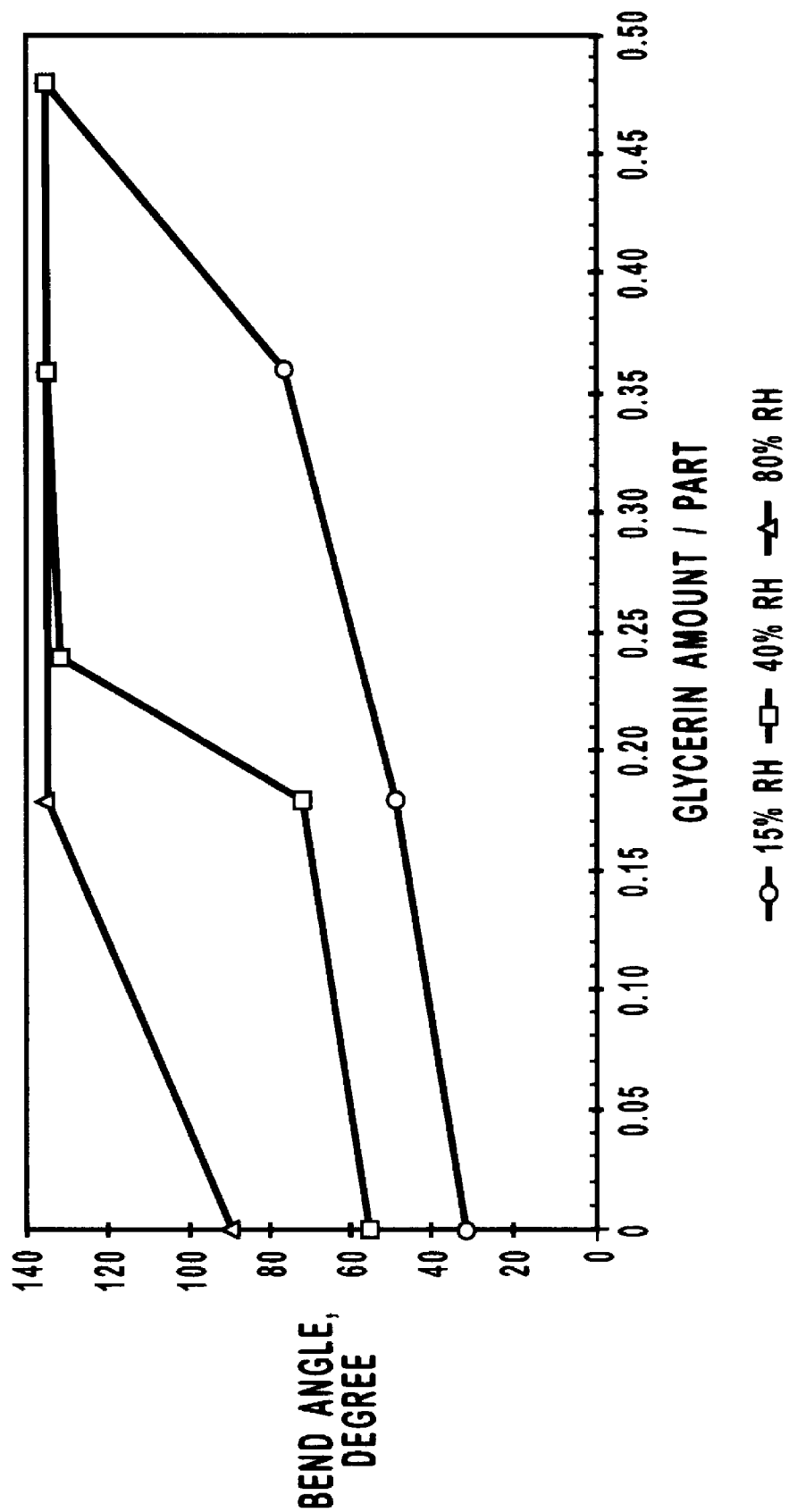
FIG. 17 is a graph showing the effect of using varying amounts of glycerin and varying the relative humidity on the maximum allowable bend angle before fracture of the starch-bound cellular matrix.

The results of the test are shown in the table depicted in FIG. 17. It was found that the flexibility of the strips was enhanced by glycerin at all relative humidity levels. It was also found that 0.45 g of glycerin per part was sufficient to impart extreme flexibility to the strips, even at only 15% relative humidity conditions. After the strips were treated with 0.45 g of glycerin per part, the strips were bent to the maximum allowable angle, 135°, without failure.

The moisture content increase due to the glycerin was apparently not the only factor causing an increase in the flexibility. Although the absorption of moisture at higher relative humidity levels due to glycerin further increased the flexibility of the strips, there was greatly enhanced flexibility even at very low relative humidity levels. It can therefore be concluded that the glycerin aids in improving the properties of the foam hinge in ways other than just by humidification. The glycerin apparently acts as a plasticizer or softener by its own right.

Additionally, the testing determined that problems associated with the viscosity of pure glycerin were avoided by utilizing an aqueous solution comprising 60% by weight of glycerin, as it was adequate for penetrating the pores of the skin of the starch-based hinges.

EXAMPLE 4

The test apparatus depicted in FIG. 16 was utilized to compare the result of treating the inner surface or compression side of a hinge in a strip with the outer surface or tension side of the hinge in a strip having a starch-based matrix. The strips were sprayed at different levels of glycerin-water solution and allowed to equilibrate at approximately 40% relative humidity.

Figure 18:
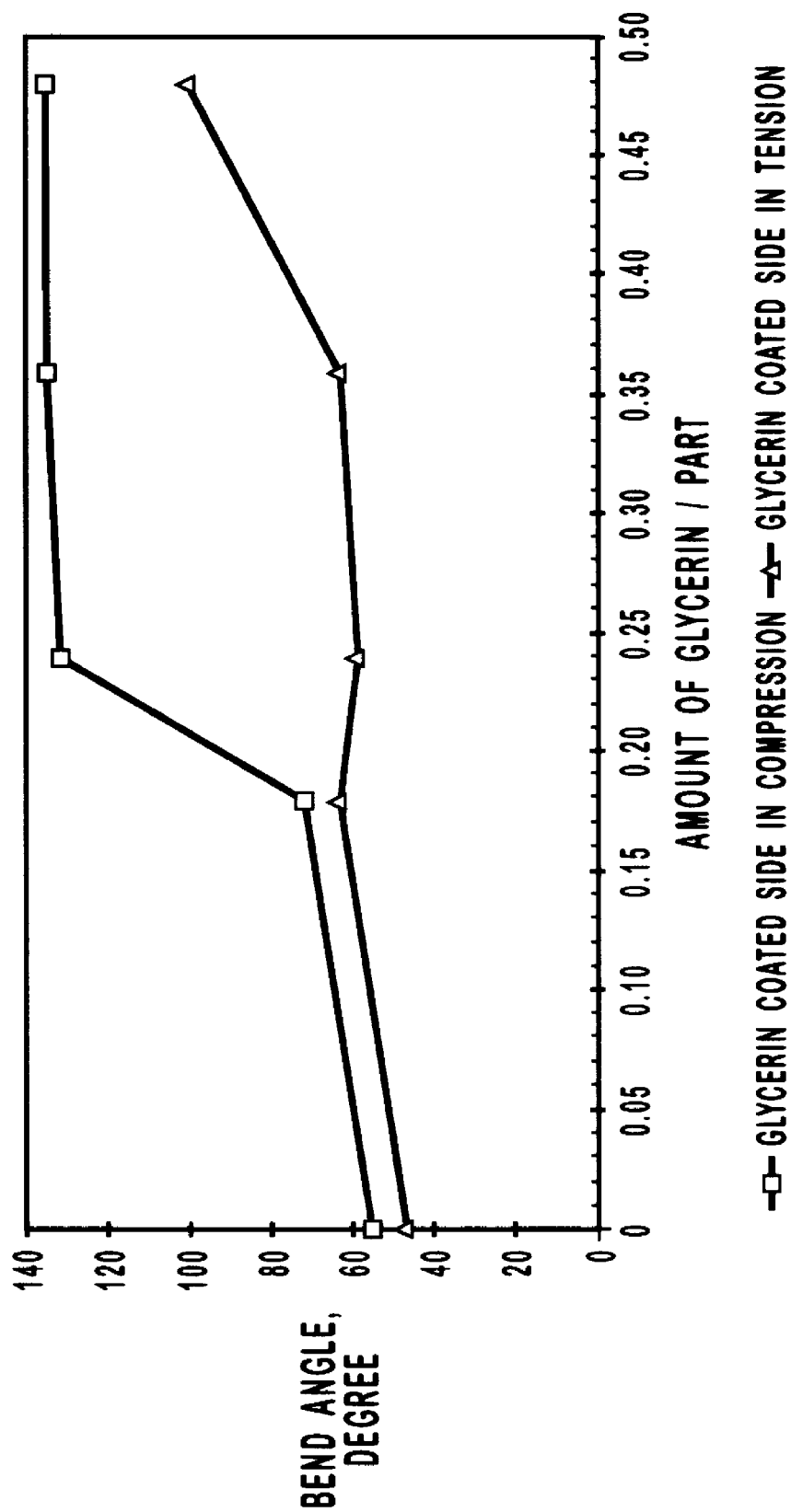
FIG. 18 is a graph comparing the effect of using varying amounts of glycerin on the compression side of a hinge verses the elongated side measured at 40% relative humidity.

The results of the testing are shown in the table depicted in FIG. 18. The flexibility of the strips treated on the inner surface greatly increased after being treated with more than about 0.2 g of glycerin per part as the strips were bent to the maximum allowable angle, 135°, without failure. The flexibility was not nearly as significantly improved for the same strips when the tension side was treated and then placed in tension. The bend angle for the strips treated on their tension side was only about 80°. It was also found that the dependence of flexibility on which surface was treated was most apparent for lower glycerin coating weights. Hence, treating the inner surface is much more effective even at lower levers of glycerin compared to treating the outer surface of the same hinge.

EXAMPLE 5

The increase in flexibility resulting from coating starch-based articles with elastomeric coatings was quantified by testing the bend angle of coated starch-based articles with the test apparatus depicted in FIG. 16. Two-piece hinged clamshell containers weighing about 20 grams each were formed in an aluminum mold having a polyether ether ketone strip and were then coated with compositions ranging in weight from about 1.5 grams to about 3.5 grams. The coatings were a Planet Polymer polyvinyl alcohol (PVA) formulation which is 17% polyvinyl alcohol, 28% glycerin, and 55% water. The coatings were applied using a Nordson hot melt system and a liner slide. The coating compositions were applied at pot and gun/hose temperatures of 90° C. and 150° C., respectively. Once coated, the clamshell containers were allowed to dry at ambient conditions for several days.

Strips were excised from the base of the two-piece clam shell containers having a starch-bound matrix. The dimensions of the strips were 7 cm×2 cm with a thickness of about 2.5 mm. The strips were equilibrated at about 30% relative humidity for about 2 hours in a humidity chamber. The strips were removed from the chamber and immediately bent using the bend test apparatus depicted in FIG. 16. Two of the strips had been coated with the PVA coating on the side placed in compression, which was the inside surface, and two of the strips had been coated with the PVA coating on the side placed in tension, which was the outside surface. Failure was manually noted as the point at which there was clear evidence of crack formation.

Figure 19:
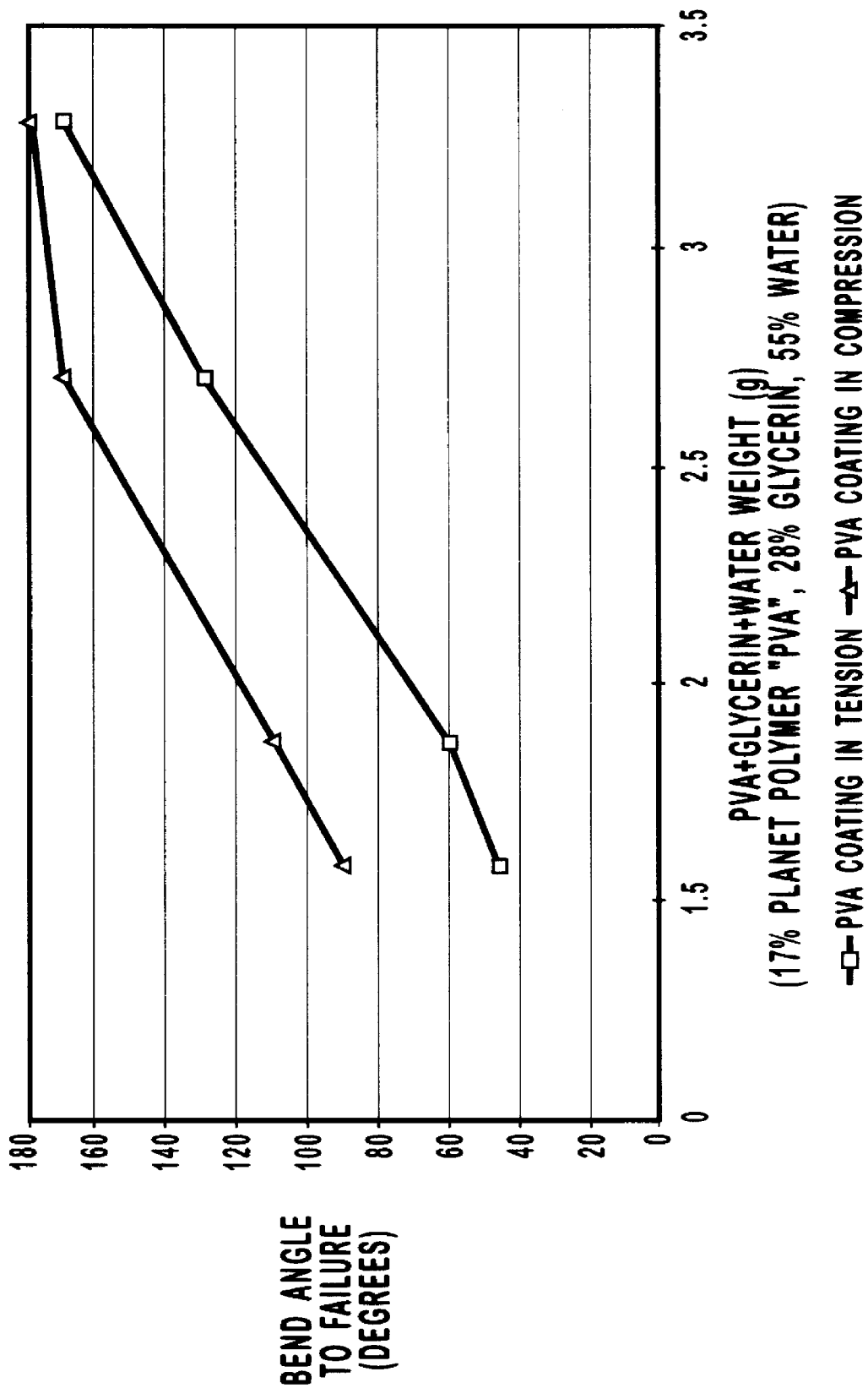
FIG. 19 is a graph showing the average bend angle at failure for the two pairs versus the total amount of polyvinyl alcohol coating applied.
Figure 20:
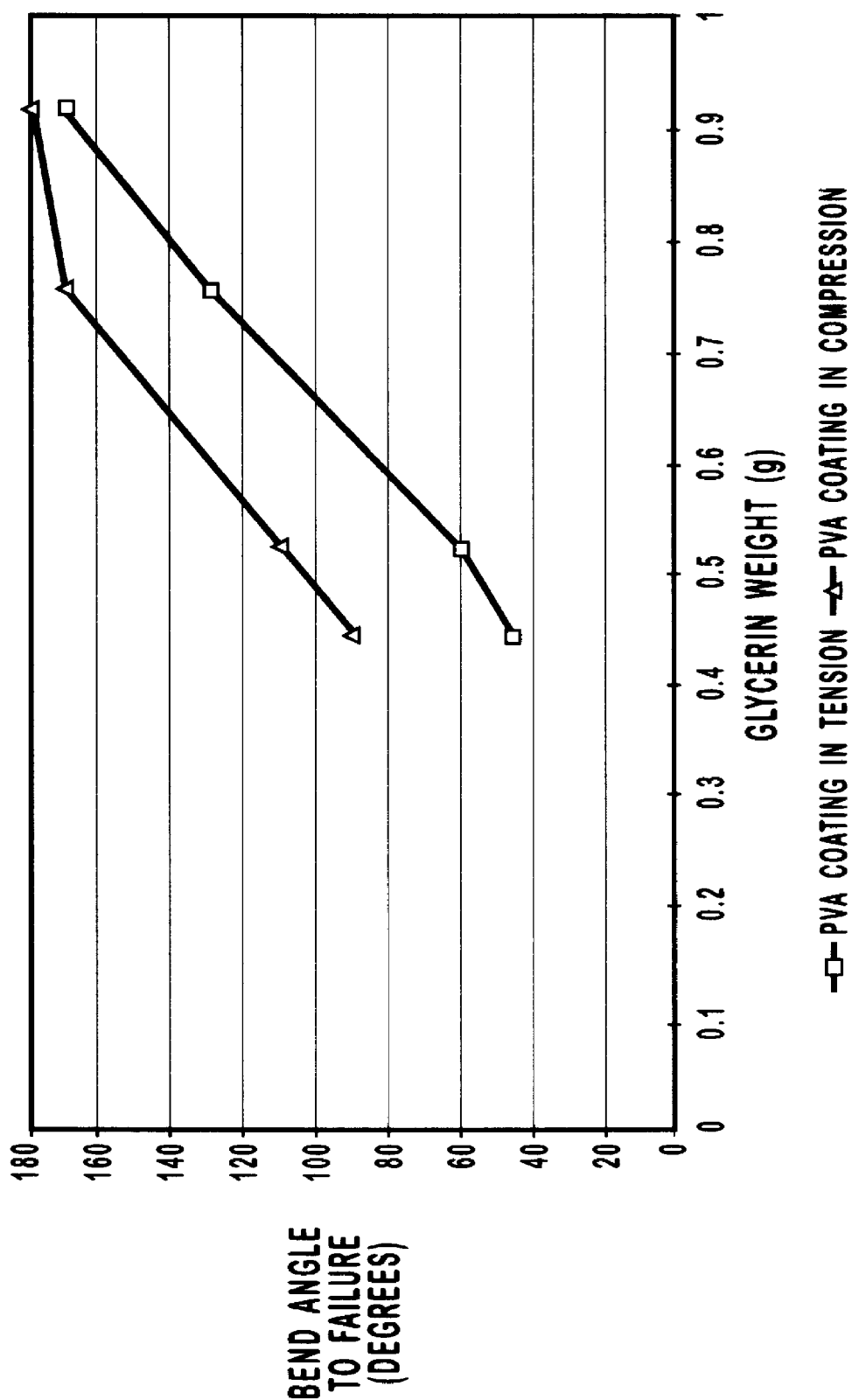
FIG. 20 is a graph showing the same data presented in FIG. 19 as a function of the glycerin content in the coatings.

The results of the test are shown in the table depicted in FIG. 19. FIG. 19 shows the average bend angle at failure for the two pairs versus the total amount of coating applied. FIG. 20 shows the same data as a function of only the glycerin content in the coating. The bend angle at failure increased with increasing amounts of coating and the bend angle was always higher when the side coated with PVA was in compression. This is most likely due to the softening and plasticizing effect of the glycerin (and water) which allows the material to strain under compression, thereby collapsing the material on the compression side of the bend point and minimizing the resultant stress on the side in tension. The bend angle at failure for all samples tested with the PVA side in compression were higher than 55°, which was angle observed for a conditioned, uncoated sample.

From the foregoing, it may be concluded that applying an elastomeric coating to the outer surface of the hinge is most effective in strengthening the hinge. Coating the inner surface of the hinge had a much less dramatic effect on hinge durability and resilience.

VII. SUMMARY.

In view of the foregoing, the present invention provides methods and systems for manufacturing integrally formed hinges within starch-bound cellular matrices.

The present invention further provides methods and systems for forming a hinge within starch-bound matrices during the manufacture of the entire article such that the article and hinge are manufactured in a single step.

In addition, the present invention provides methods and systems that eliminate the need to introduce foreign materials such as paper strips that need to be inserted into the molding apparatus during the molding of starch-based compositions into the desired articles.

The present invention also provides methods and systems for manufacturing integrally formed hinges in starch-bound articles that allow the articles to be opened and closed repeatedly without substantial rupture of the starch-bound matrix.

Accordingly, the present invention discloses how to increase the collapsibility or ability of the interior skin portion of the hinge to buckle without debilitating fracture during closure of the article halves, and the ability of the interior skin portion to then re-extend during opening of the article halves without debilitating fracture.

Similarly, the present invention discloses how to reduce the strain, and increase the strength of the exterior skin portion when subjected to tensile stress, during closure of the article halves such that the exterior skin portion does not suffer debilitating fracture.

The present invention further provides methods and systems for manufacturing a hinge structure that includes multiple hinges or hinge portions that distribute the mechanical stresses and deformation over a wide area of the hinge area and result in a more durable hinge.

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. An article of manufacture including a hinge structure, the hinge structure having a starch-bound cellular matrix and comprising an interior skin portion separated from an exterior skin portion by an intermediate cellular core, the interior skin portion including a crease such that the hinge structure has a reduced cross-section at the crease, the exterior skin portion having a thickness and the interior skin portion having a thickness that is less than the thickness of the exterior skin portion.

2. An article of manufacture as defined in claim 1, wherein the interior skin portion has been treated with a softening agent for imparting to the interior skin portion increased bendability or collapsibility during bending of the hinge structure.

3. An article of manufacture as defined in claim 2, wherein the softening agent comprises a polyol.

4. An article of manufacture as defined in claim 3, wherein the polyol comprises glycerin.

5. An article of manufacture as defined in claim 3, wherein the polyol is selected from the group consisting of polyethylene glycol, propylene glycol, polypropylene glycol, sorbitol, and mixtures of the foregoing.

6. An article of manufacture as defined in claim 1, wherein the exterior skin portion has been treated with an elastomeric coating for imparting increased resistance against fracture due to elongation of the exterior skin portion during bending of the hinge structure.

7. An article of manufacture as defined in claim 6, wherein the elastomeric coating comprises polyvinyl alcohol.

8. An article of manufacture as defined in claim 6, wherein the elastomeric coating is selected from the group consisting of polylactic acid, natural latex, derivatives of the foregoing, and mixtures of the foregoing.

9. An article of manufacture as defined in claim 1, wherein the reduced cross section at the crease reduces the bending angle of the hinge such that strain on the exterior skin portion is reduced during bending of the hinge structure.

10. An article of manufacture as defined in claim 1, wherein the hinge structure further includes one or more additional creases substantially parallel to the crease to form a multiple hinge structure.

11. An article of manufacture as defined in claim 10, wherein the hinge structure further includes a swell between the crease and the one or more additional creases.

12. An article of manufacture as defined in claim 1, wherein the interior skin and the exterior skin have respective densities that are substantially similar.

13. An article of manufacture as defined in claim 1, wherein the article includes two main structural elements integrally connected to either side of the hinge structure.

14. An article of manufacture as defined in claim 1, wherein the article comprises a clam shell container.

15. An article of manufacture comprising a hinge structure having a starch-bound cellular matrix, the hinge structure including an intermediate cellular core disposed between an interior skin portion and an exterior skin portion, the hinge structure including a bending region at or near a depression in the interior skin portion, the exterior skin having a thickness at the bending region, the interior skin portion having a thickness at the bending region that is less than the thickness of the exterior skin portion at the bending region.

16. An article of manufacture as defined in claim 15, wherein the article comprises a clam shell container.

17. An article of manufacture as defined in claim 16, wherein the clam shell container further includes a coating material.

18. An article of manufacture as defined in claim 17, wherein the coating material comprises polyvinyl alcohol.

19. An article of manufacture as defined in claim 17, wherein the coating material increases the strength of the exterior skin portion of the hinge.

20. An article of manufacture as defined in claim 15, wherein the interior skin portion of the hinge has been treated with a polyol.

21. An article of manufacture as defined in claim 20, wherein the polyol comprises glycerin.

22. An article of manufacture comprising a multiple hinge structure having a starch-bound cellular matrix, the multiple hinge structure comprising an interior skin portion separated from an exterior skin portion by an interior cellular core, the multiple hinge structure also including at least two depressions that are substantially parallel to each other in the interior skin portion of the hinge structure, the intermediate skin portion having a thickness that is less than the thickness of the exterior skin portion.

23. An article of manufacture as defined in claim 22, wherein the article comprises a clam shell container.

24. An article of manufacture as defined in claim 23, wherein the clam shell container further includes a coating material.

25. An article of manufacture as defined in claim 24, wherein the coating material comprises polyvinyl alcohol.

26. An article of manufacture as defined in claim 24, wherein the coating material increases the strength of the exterior skin portion of the hinge.

27. An article of manufacture as defined in claim 22, wherein the interior skin portion of the hinge has been treated with a polyol.

28. An article of manufacture as defined in claim 27, wherein the polyol comprises glycerin.

29. An article of manufacture having a starch-bound cellular matrix and comprising first and second halves and a hinge structure disposed between the first and second halves, the first half being connected to the hinge structure by a first arm and the second half being connected to the hinge by a second arm, the hinge structure including an interior skin portion, an exterior skin portion, an intermediate cellular core disposed between the interior skin portion and the exterior skin portion, and at least one depression within the interior skin portion between the first and second arms defining a bending region of reduced cross section, the exterior skin portion having a thickness at the bending region, the interior skin portion having a thickness at the bending region that is less than the thickness of the exterior skin portion at the bending region.

30. An article of manufacture as defined in claim 29, wherein the article comprises a clam shell container.

31. An article of manufacture as defined in claim 30, wherein the clam shell Container includes an interior side that has been treated with a wax coating to render the interior side more resistant to moisture.

32. An article of manufacture as defined in claim 29, wherein the interior skin portion has been treated with a polyol.

33. An article of manufacture as defined in claim 29, wherein the exterior skin portion has been treated with an elastomeric coating.

34. An article of manufacture as defined in claim 29, wherein the elastomeric coating comprises polyvinyl alcohol.

35. An article of manufacture comprising an integrally molded article having a starch-bound cellular matrix, the article including a first half connected to a second half by means of a hinge structure that is integrally molded with the first and second halves and which also comprises the starch-bound cellular matrix, the hinge structure providing means for pivoting the first and second halves relative to each other at the hinge structure, said hinge structure comprises an interior skin portion separated from an exterior skin portion by an intermediate cellular core, the interior skin portion having a depression such that the hinge structure has a reduced cross-section at the depression.

36. An article of manufacture as defined in claim 35, wherein the integrally molded article comprises a clam shell container.

37. An article of manufacture as defined in claim 35, wherein the exterior skin portion having a thickness and the interior skin portion having a thickness that is less than the thickness of the exterior skin portion.

38. An article of manufacture as defined in claim 37, wherein the hinge structure includes at least one bending initiation groove in the exterior skin portion.

39. An article of manufacture as defined in claim 35, wherein the interior skin portion having a plurality of depressions such that the hinge structure is a multiple hinge structure and has reduced cross-section at each of the plurality of depressions, the exterior skin portion having a thickness and the interior skin portion having a thickness that is less than the thickness of the exterior skin portion.

* * * * *

UNITED STATES PATENT AND TRADEMARK OFFICE
CERTIFICATE OF CORRECTION

PATENT NO. : 5,843,544

DATED : Dec. 1, 1998

INVENTOR(S) : Per Just Andersen; Simon K. Hodson

Page 1 of 3

It is certified that error appears in the above-identified patent and that said Letters Patent is hereby corrected as shown below:

Title Page, Abstract, line 18, after "polyols" insert --to--

Page 3, line 65, change "Tanagawa et al.." to --Tamagawa et al. .--

Col. 2, line 67, after "order" delete --to--

Col. 10, line 5, before "protectors" change "comer" to --corner--

Col. 12, line 27, after "aid" insert --in--

Col. 13, line 8, after "having" insert --a--

Col. 13, line 14, after "Mineral" delete --ii--

Col. 14, line 2, after "water." change "Stearate" to --Stearates--

Col. 16, line 16, after "microwaves" insert --can--

Col. 16, line 54, after "60." insert a paragraph break

Col. 17, line 13, after "82." change "Filing" to --Filling--

Col. 17, line 52, delete second occurance of --attached to--

Col. 17, line 65, after "removed" change "form" to --from--

Col. 18, line 31, after "It" insert --is--

UNITED STATES PATENT AND TRADEMARK OFFICE
CERTIFICATE OF CORRECTION

PATENT NO. : 5,843,544

DATED : Dec. 1, 1998

INVENTOR(S) : Per Just Andersen; Simon K. Hodson

Page 2 of 3

It is certified that error appears in the above-identified patent and that said Letters Patent is hereby corrected as shown below:

Col. 19, line 17, after "that" insert --the--

Col. 21, line 65, after "structure" change "10" to --200--

Col. 22, line 25, after "opposite" change "crease" to --creases--

Col. 22, line 25, after "and" change "30b" to --230b--

Col. 22, line 61, after "compared" insert --to--

Col. 22, line 62, after "structure" change "10" to --200--

Col. 23, line 26, after "structure" change "10" to --200--

Col. 23, line 27, after "structure" change "10" to --200--

Col. 23, line 47, after "swell" change "234" to --232--

Col. 24, line 64, after "articles," change "particular" to --particularly--

Col. 25, line 28, after "elongate" change "with" to --without--

Col. 26, line 40, after "skin of" delete --ii--

Col. 26, line 50, after "is" insert --a--

Col. 27, line 26, after "of" insert --the--

UNITED STATES PATENT AND TRADEMARK OFFICE
CERTIFICATE OF CORRECTION

PATENT NO. : 5,843,544

DATED : Dec. 1, 1998

INVENTOR(S) : Per Just Andersen; Simon K. Hodson

It is certified that error appears in the above-identified patent and that said Letters Patent is hereby corrected as shown below:

Col. 27, line 28, after "had" insert --a--

Col. 27, line 34, after "skin" delete --of the--

Col. 28, line 10, after "necks" insert --240a and 240b--

Col. 28, line 39, after "end" delete --414--

Col. 28, line 41, after "track" change "412" to --422--

Col. 29, line 33, after "lower" change "levers" to --levels--

Col. 30, line 12, after "was" insert --the--

Col. 32, line 48, after "shell" change "Container" to --container--

Signed and Sealed this

Eighteenth Day of January, 2000

Attest:

Q. TODD DICKINSON

*Attesting Officer*

*Commissioner of Patents and Trademarks*